United States Patent [19]

Marx et al.

[11] 3,905,962
[45] Sept. 16, 1975

[54] OESTRATRIENES

[76] Inventors: Arthur Friedrich Marx, Florence Nightingalelaan 12, Delft; Rudolf De Lang, Burg. Zaneveldstraat 276, Maassluis, both of Netherlands

[22] Filed: Apr. 17, 1974

[21] Appl. No.: 461,806

Related U.S. Application Data

[63] Continuation-in-part of Ser. No. 121,582, March 5, 1971, abandoned.

[30] Foreign Application Priority Data

Mar. 6, 1970  United Kingdom............ 10995/70

[52] U.S. Cl........ 260/239.55 D; 195/51; 260/239.5; 260/239.55 R; 260/397.1; 260/397.45; 260/397.5 A; 424/241
[51] Int. Cl......................................... C07c 173/00
[58] Field of Search............................ 260/239.55 D

[56] References Cited
UNITED STATES PATENTS

| | | |
|---|---|---|
| 3,560,486 | 2/1971 | Marx et al. ............... 260/239.55 D |
| 3,585,191 | 6/1971 | Marx et al. ............... 260/239.55 D |
| 3,585,192 | 6/1971 | Marx et al. ............... 260/239.55 D |
| 3,629,243 | 12/1971 | Marx et al. ............... 260/239.55 D |

OTHER PUBLICATIONS
Chem. Abstracts, 75: 151979a.

*Primary Examiner*—Ethel G. Love
*Attorney, Agent, or Firm*—Robert E. Burns; Emmanuel J. Lobato; Bruce L. Adams

[57] ABSTRACT

New oestratrienes of the formula

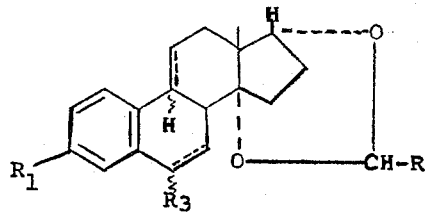

in which the dotted lines in the positions 6–7 and 9–11 indicate the optional presence of another bond, and wherein R represents a hydrogen atom, an aliphatic hydrocarbon group having less than 10 carbon atoms, a cycloalkyl group having less than 7 carbon atoms, an aryl group having less than 11 carbon atoms and which may be substituted by a nitro group or by methoxy groups, an adamantyl group, a furyl group or a thienyl group, $R_1$ represents a hydrogen atom or a group $OR_2$, wherein $R_2$ represents a hydrogen atom, an aliphatic hydrocarbon group having less than 4 carbon atoms, a β-dimethylaminoethyl group, an acyl residue derived from acetic or sulfuric acid or an alkali metal salt thereof or a 1H-tetrazolyl group, and $R_3$ represents a hydrogen atom, a hydroxyl group, an acetoxy group or an oxo group, possess therapeutically useful properties including oestrogenic and hypocholesterolemic activities.

46 Claims, No Drawings

OESTRATRIENES

RELATED APPLICATIONS

This application is a C.I.P. of allowed application Ser. No. 121,582 filed 5 March 1971 and herewith abandoned.

FIELD OF THE INVENTION

This invention relates to a new therapeutically useful cestratrienes, to process for their preparation and to pharmaceutical compositions containing them.

THE INVENTION

The oestratrienes of the present invention have the general formula:

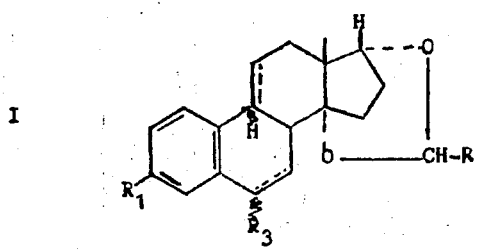

in which the dotted lines in the positions 6–7 and 9–11 indicate the optional presence of another bond, and wherein R represents a hydrogen atom, an aliphatic hydrocarbon group having less than 10 carbon atoms, a cycloalkyl group having less than 7 carbon atoms, an aryl group having less than 11 carbon atoms and which may be substituted by a nitro group or by methoxy groups, an adamantyl group, a furyl group or a thienyl group, $R_1$ represents a hydrogen atom or a group $OR_2$, wherein $R_2$ represents a hydrogen atom, an aliphatic hydrocarbon group having less than 4 carbon atoms, a β-dimethylaminoethyl group, an acyl residue derived from acetic or sulfuric acid or an alkali metal salt thereof or a) 1H-tetrazoalyl group, and $R_3$ represents a hydrogen atom, a hydroxyl group, an acetoxy group or an oxo group.

The oestratrienes of the general formula I are therapeutically useful compounds possessing oestrogenic and hypocholesterolemic activities; in some cases there is a favourable ratio between both activities. These compounds can be applied for human as well as veterinary uses; they can be administered orally as well as parenterally.

DETAILED DESCRIPTION

The oestratrienes of the general formula I may be prepared by methods known for the preparation of analogous compounds. The terms "methods known per se" and in "known manner" used hereafter refer to methods heretofore used or described in chemical literature. The oestratrienes of the general formula I, wherein the 6-7-and 9-11 positions are saturated, $R_1$ represents the group $OR_2$, $R_3$ is a hydrogen atom and R is as hereinbefore defined, and conform also to the general formula:

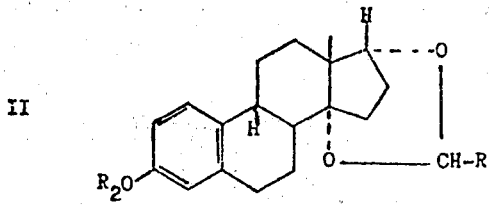

can be prepared by decarboxylation in known manner of oestratriene-17β-carboxylic acid of the general formula:

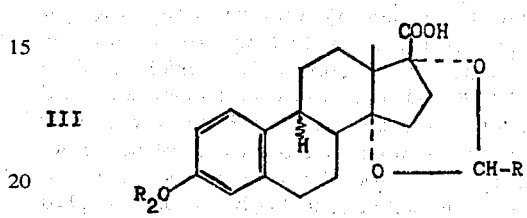

wherein R and $R_2$ are as hereinbefore defined.

This decarboxylation can be carried out, for example, by heating the carboxylic acid in an organic medium with lead tetraacetate in a nitrogen atmosphere. Suitable organic solvents are for instance N,N-dimethylformamide, N,N-dimethyl acetamide, acetonitrile, 2,4,6-collidine, hexamethyl phosphoric triamide, diethylene glycol dimethyl ether or N-methyl2-pyrrolidon.

According to a modification of this process, the decarboxylation is carried out with a 14α,17α-phenylborylenedioxy-oestratriene-17β-carboxylic acid of the general formula:

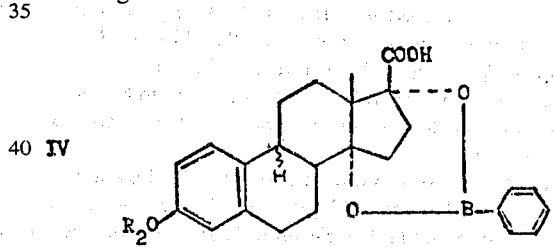

wherein $R_2$ is as hereinbefore defined, and the 14α, 17α-phenylborylenedioxy-oestratriene of the general formula:

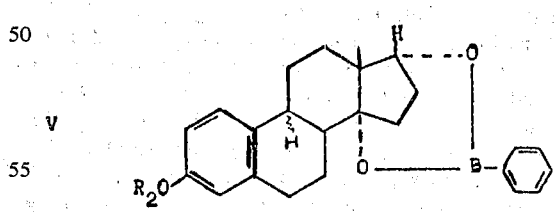

thus obtained is then converted into an oestratriene of the formula II in manner known per se.

This conversion can be carried out in two reaction steps:

a. First, a 14α, 17α-phenylborylenedioxy-oestratriene of the formula V is hydrolyzed in a suitable alkaline medium, for example a mixture of dilute potassium hydroxide solution and acetone, preferably at a slightly elevated temperature, for instance 50°–60°C.

b. The 14α,17α-dihydroxy-oestratriene of the general formula:

VI 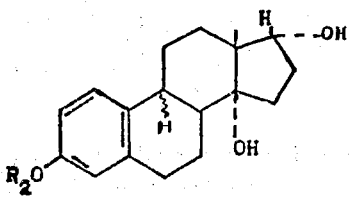

thus obtained can then be converted into a 14α,17α-(optionally substituted methylene)dioxy-oestratriene of the formula II by reaction with an aldehyde of the formula RCHO, wherein R is as hereinbefore defined.

The reaction with the aldehyde RCHO is preferably carried out at room temperature in the presence of a strong acid as catalyst, for example perchloric, p-toluene sulfonic, sulfuric, hydrochloric acid or phosphorus pentoxide, and if desired in an inert organic solvent, for example a halogenated alkane, methyl acetate, ethyl acetate, dioxane, tetrahydrofuran, benzene or dimethyl formamide. By the decarboxylation of an oestratriene-17β-carboxylic acid of the formula III or of a 14α,17α-phenylborylenedioxy-oestratriene-17β-carboxylic acid of the formula IV with lead tetraacetate simultaneously a mixture of the corresponding 6α- and 6β-acetoxy derivatives of the compounds of the formula II, respectively of those of the formula V is obtained.

The oestratriene-17β-carboxylic acids of the general formula III are new compounds; some of these acids have been disclosed in our compending U.S. application Ser. No. 856,483 (now U.S. Pat. No. 3,585,192) and corresponding Belgian Pat. No. 738,668.

The acids of formula III can be prepared in 8 reaction steps from the known compound 14α,17α-dihydroxy-progesterone.

a. First, this compound can be microbiologically hydroxylated in the 11-position, for example with *Cunninghamella balesleeana*, *Curvularia lunata* or *Asperigillus ochraceus*, to give 11,14α,17α-trihydroxyprogesterone.

b. The product of (a) can be dehydrated to the corresponding 9(11)-dehydro derivative. The 11α-isomer for example can be acylated with methane sulfonyl chloride, to 11α, 14α, 17α-trihydroxyprogesterone-11-methane sulfonate, which, in a suitable organic solvent, such as dimethylformamide, can then be heated with lithium chloride to give 14α,17α-dihydroxy-9(11)-dehydroprogesterone. The 11β-isomer, 11β, 14α, 17α-trihydroxyprogesterone, can be reacted with N-bromo-acetamide to give the corresponding 9(11)-dehydro derivative. Preferably, this reaction is carried out at room temperature, in a suitable organic medium, for example pyridine.

c. The product of (b) can be dehydrogenated in the 1,2-position, for example by reaction with selenium oxide or 2,3-dichloro4,5-dicyanobenzoquinone, or by fermentation with a suitable microorganism, such as *Corynebacterium simplex*, to give 14α,17α-dihydroxy-1,9(11)-bisdehydroprogesterone, that is, 14α,17α-dihydroxy-pregna-1,4,9(11)-triene-3,20-dione.

d. This pregnatriene derivative, can then be aromatized, for example by heating it in pyridine or N,N-dimethyl formamide with zinc dust, to give 3,14α,17α-trihydroxy-19-nor-pregna1,3,5(10),9,(11)-triene-20-one.

e. The 9(11)-double bond of this compound can then be reduced again, for example catalytically, using platinum oxide or palladium as catalyst, to give 3,1-4α,17α-trihydroxy-19-norpregna-1,2,5(10)-triene-20-one and its 9β-isomer, which compounds can be separated by crystallization or column chromatography.

Each of the isomers can then be reacted further to give respectively the 9α- and the 9β-isomer of an oestratriene17β-carboxylic acid of the formula III.

f. For example, the α-isomer of the product of (e), i.e. 3,14α,17α-trihydroxy-19-nor-pregna-1,3,5(10)-trien-20-one, can be converted into a corresponding either of the general formula:

VII 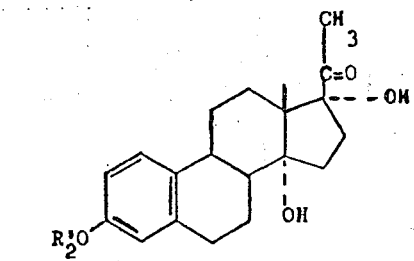

wherein R′₂ represents an aliphatic hydrocarbon group having less than 4 carbon atoms, a β-dimethylaminoethyl group or a 1 H-tetrazoyl group by reaction with an appropriate halogenide of the formula R′₂-hal, or sulfate of the formula (R′₂)₂SO₄. The reaction is preferably carried out in an organic medium in the presence of an alkaline substance, such as the hydroxide, hydride or carbonate of an alkali metal. The ether of formula VII wherein R′₂ represents a methyl group can also be prepared by reaction with diazomethane in a diethyl ether solution.

g. An ether of formula VII thus obtained can be converted into the corresponding 17β-carboxylic acid by oxidation, for example by means of sodium hypobromite in the presence of the hydroxide of an alkali metal.

h. The product of (g) can then be reacted with an aldehyde of the formula RCHO, wherein R is hereinbefore defined, in the manner described above for the preparation of the 14α,17α-(substituted methylene)dioxyoestratrienes of the formula II to give an oestratriene-17β-carboxylic acid of the formula III.

In the same manner, the 9≈-isomer of the product of (e) can be converted into the corresponding 9β-isomer of an oestratriene-17β-carboxylic acid of formula III. The 14α,17α-phenylborylenedioxy-oestratriene-17β-carboxylic acids of the formula IV can be prepared in analogous manner by reacting a 14α,17α-dihydroxy-17β-carboxylic acid derivative of (g) with phenylboronic acid, in a suitable solvent, for example acetone or tetrahydrofuran, preferably at room temperature.

The oestratrienes of the general formula II can also be obtained by using a 14α,17α-(optionally substituted methylene)dioxy-androstene-17β-carboxylic acid as starting material. According to this process an androstene-17β-carboxylic acid of the general formula:

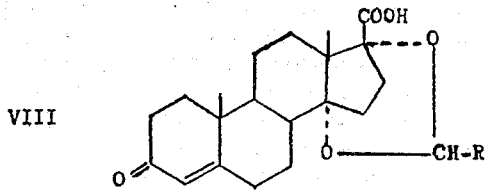

VIII wherein R is as hereinbefore defined, is first decarboxylated in the same manner as described above for the oestratriene-17β-carboxylic acids of the formula III and the androstene derivative of the general formula:

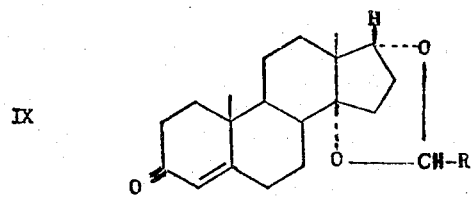

IX thus obtained is then converted in an oestratriene of the formula II in manner known per se.

This conversion can be carried out in 2 reaction steps:
  a. An androstene derivative of the formal IX can be first dehydrogenated in the 1,2-position, for example by reaction with selenium dioxide or by fermentation with a suitable microorganism, such as *Corynebacterium simplex.*
  b. The 1,2-dehydro derivative thus obtained can then be aromatized, for example by means of naphthyllithium. The reaction is preferably carried out in boiling tetrahydrofuran and in a nitrogen atmosphere. A 3-hydroxy-oestratriene thus obtained can be converted into a corresponding 3-ether of the formula II in the same manner as described above for the preparation of the ethers of the formula VII.

According to a modification of this process 14α,17α-phenylborylenedioxy-androst-4-en-3-one-17β-carboxylic acid is decarboxylated to 14α,17α-phenylborylenedioxy-androst-4-en-3-one. This compound can then be converted into oestratrienes of the formula II in manner known per se.

This conversion can be carried out in 4 reaction steps:
  a. First, 14α,17α-dihydroxy-androst-4-en-3-one can be hydrolyzed to 14α,17α-dihydroxy-androst-4-en-3-one in the manner described above for the corresponding oestratrienes of the formula V.
  b. In the compound thus obtained a double bond in the 1,2-position can be introduced, for example by fermentation with suitable microorganisms, such as *Corynebacterium simplex.*
  c. The 1,2-dehydro derivative, i.e. 14α,17α-dihydroxy-androsta-1,4-dien-3-one can then be reacted with an aldehyde of the formula RCHO, wherein R is as hereinbefore defined, in the manner described above for the corresponding oestratrienes of the formala VI.
  d. A 14α,17α-(optionally substituted methylene)-dioxy derivative thus obtained can then be aromatized to the corresponding 3-hydroxy-oestratriene and converted into a corresponding 3-ether of the formula II in the same manner as described above. The androstene-17β-carboxylic acids of the formula VIII are also new compounds; some of these have been disclosed in our copending U.S. application Ser. No. 856,467 (nos U.S. Pat. No. 3,585,191) and corresponding Belgian Pat. No. 738,666.

The acids of the formula VIII can be prepared from the known compound 14α,17α,21-trihydroxyprogesterone. First, this compound can be converted into 14-α,17α-dihydroxy-androst-4-en-3-one-17β-carboxylic acid, for example by means of periodic acid at room temperature in a suitable medium, such as pyridine and water. This compound can then be converted into an androstene-17β-carboxylic acid of the formula VIII by reaction with an aldehyde of the formula RCHO, wherein R is as hereinbefore defined, in the manner described above. The compound 14α,17α-dihydroxy-androst-4-en-3-one-17β-carboxylic acid can also be used to prepare 14α,17α-phenylborylenedioxy-androst-4-en-3-one-17β-carboxylic acid, in the same manner as described above for the preparation of the corresponding oestratriene derivatives of formula IV.

According to another feature of the invention the oestratrienes of the general formula II can be prepared using the known compound 14α-hydroxyoestrone as starting material.

This compound can first be converted into a corresponding 3-ether of the generall formula:

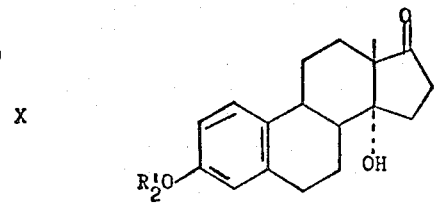

X wherein R₂' is as hereinbefore defined. The reaction can be carried out in the same manner as described above for the preparation of the ethers of formula VII.

An oestrone derivative of formula X can be reacted with hydrazine to obtain the corresponding 17-hydrazone derivative. The reaction is preferably carried out in the presence of a catalyst, for example triethyl amine. The hydrazone can then be oxidized, for example with iodine in a mixture of triethyl amine and tetrahydrofuran. The 17-iodo derivative thus obtained can be reduced, for example with sodium in an alkanol, to obtain the corresponding 16-dehydro derivative, that after conversion into the 16α,17α-epoxy derivative, for example with a peracid, can be reduced again, for example with LiAlH₄ to obtain a 14α,17α-dihydroxy-oestratriene of the formula VI. A 14α,17α-dihydroxy-oestratriene thus prepared can then be reacted in the manner described above with an aldehyde of the formula RCHO, wherein R is as hereinbefore defined, to obtain an oestratriene of the general formula II. According to a modification of this process an oestrone derivative of the general formula:

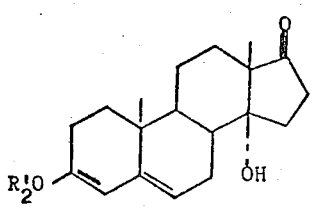

XI wherein $R_2'$ is as hereinbefore defined, is converted in the manner described above to the corresponding 17α-hydroxy-androstene derivative, i.e. 14α,17α-dihydroxy-androst-4-en-3-one. The conversion of this compound into oestratrienes of formula II has already been described above.

An oestratriene of the general formula II obtained according to one of these processes can be used to prepare other oestratrienes of the general formulae I or II.

An oestratriene of the formula II, wherein $R_2 = R_2'$, can be converted into the corresponding oestratriene of the formula II, wherein $R_2$ represents a hydrogen atom, by heating it with an alkali metal salt of a lower alkanethiol in a suitable solvent, such as N,N-dimethylformamide.

The same reaction can be carried out with a 14α,17α-dihydroxy-oestratriene of the formula VI, wherein $R_2 = R_2'$. The compound 3,14α,17α-trihydroxy-oestra-1,3,5(10)-triene thus obtained can then be converted in the manner described above with an aldehyde of the formula RCHO, wherein R is as hereinbefore defined, into an oestratriene of the formula II, wherein $R_2$ represents a hydrogen atom.

An oestratriene of the formula II, wherein $R_2$ represents an acyl residue derived from acetic or sulfuric acid, is preferably prepared by reacting a corresponding 3-hydroxy-oestratriene of the formula II with the appropriate acid chloride or acid anhydride in a suitable medium, for example pyridine.

To prepare an oestratriene of the general formula I, wherein $R_1$ represents a hydrogen atom, a 3-hydroxy-oestratriene of the formula II is first reacted with a 5-chloro-1H-tetrazole or a 2-chloro-1,3-oxazole derivative in a suitable organic medium, for example acetone, under alkaline catalysis. The corresponding 3-ether thus obtained is then reduced to an oestratriene of the formula I, wherein $R_1$ represents a hydrogen atom, in a hydrogen atmosphere under metal or metal oxide catalysis in a suitable organic solvent. For example, the reaction can be carried out in an ethyl alcohol solution with palladium on coal as catalyst.

An oestratriene of the general formula I, wherein the 9-11 position is saturated, can be used to prepare the corresponding 9(11)-dehydro derivative, for example by reaction with chloranil in a suitable organic solvent, such as t.butanol.

A 6,7-dehydro-oestratriene of the general formula I can be prepared by conversion in manner known per se of the corresponding androstane derivative of the formula IX.

The conversion can be carried out in 3 reaction steps.
a. First, the androstane derivative can be dehydrogenated in the 1,2-position in the manner described above.
b. The 1,2-dehydro derivative thus obtained can then be dehydrogenated in the 6,7-position, for example by reaction with 2,3-dichloro-5,6-dicyano-1,4-benzoquinone in a suitable organic solvent, such as dioxane, under acid catalysis at room temperature.
c. The androsta-1,4,6-triene derivative thus prepared can then be aromatized to a 6,7-dehydro-oestratriene of the formula I by means of naphthyllithium in the manner described above.

The 6-acetoxy derivatives of the oestratrienes of the formula II obtained by the decarboxylation of an oestratriene-17β-carboxylic acid of the formula III with lead tetraacetate can be hydrolyzed in usual manner to the corresponding 6-hydroxy derivatives of the oestratrienes of the formula II. This reaction can be carried out for example by boiling a 6-acetoxy derivative in dioxane with dilute sodium hydroxide solution.

A 6-hydroxy derivative thus obtained can be converted into the corresponding 6-oxo derivative of an oestratriene of the formula II by oxidation, for example with chromic trioxide in acetic acid.

When the 6-acetoxy derivatives obtained by the decarboxylation of a 14α,17α-phenylborylenedioxy-oestratriene-17β-carboxylic acid of the formula IV with lead tetraacetate are hydrolyzed in the manner described above, the phenylborylenedioxy group is hydrolyzed simultaneously. A 6-hydroxy derivative of the 14α,17α-dihydroxy-oestratrienes of the formula VI thus obtained can be reacted with an aldehyde of the formula RCHO, wherein R is as hereinbefore defined, in the manner described above.

The 6-hydroxy derivatives of the oestratrienes of formula II thus prepared can then be used again to obtain the corresponding 6-oxo-derivatives.

Among the oestratrienes according to formula I which are prepared by the aforesaid processes are the following:

3-hydroxy-14α,17α-methylenedioxy-oestra-1,3,5(10)-triene.
3-hydroxy-14α,17α-ethylidenedioxy-oestra-1,3,5(10)-triene
3-hydroxy-14α,17α-hexylidenedioxy-oestra-1,3,5(10)-triene
3-methoxy-14α,17α-ethylidenedioxy-oestra-1,3,5(10)-triene
3-methoxy-6α, and 6β-acetoxy-14α,17α-ethylidenedioxy-oestra-1,3,5(10)-triene
3-methoxy-14α,17α-ethylidenedioxy-9β-oestra-1,3,5(10)-triene.
3-methoxy-14α,17α-pentylidenedioxy-oestra-1,3,5(10)-triene
3-methoxy-14α,17α-hexylidenedioxy-oestra-1,3,5(10)-triene
3-methoxy-14α,17α-benzylidenedioxy-oestra-1,3,5(10)-triene
3-hydroxy-14α,17α-cyclohexylmethylenedioxy-oestra-1,3,5(10)-triene
3-hydroxy-14α,17α-(2-methylpropylidene) dioxy-oestra-1,3,5(10)-triene
3-hydroxy- 14α,17α-hexylidenedioxy-oestra-1,3,5(10)-triene
3-hydroxy-14α,17α-decylidenedioxy-oestra-1,3,5(10)-triene
3-methoxy-14α,17α-(4'-nitro-benzylidene)dioxy-oestra-1,3,5(10)-triene
3-methoxy-14α,17α-(2-furfurylidene)dioxy-oestra-1,3,5, (10)-triene 3-methoxy-14α,17α-(2-thienylmethylene)dioxy-oestra-1,3,5(10)-triene
3-methoxy-14α,17α-(1-naphthylmethylene)dioxy-oestra-1,3,5(10)-triene
3-methoxy-14α,17α-(3',4',5'-trimethoxy-benzylidene)dioxy-oestra-1,3,5(10)-triene
3-methoxy-14α,17α-(1-adamantylmethylene)dioxy-oestra-1,3,5(10)-triene
3-methoxy-14α, 17α-(2-butenylidene)dioxy-oestra-1,3,5(10)-triene
3-hydroxy-14α,17α-hexylidenedioxy-oestra-1,3,5(10)-triene 3-isopropyl ether.
3-hydroxy-14α,17α-hexylidenedioxy-oestra-1,3,5(10)-triene 3-allyl ether
3-hydroxy-14α,17α-hexylidenedioxy-oestra-1,3,5(10)-triene 3- (β-dimethylaminoethyl) ether
3-hydroxy-14α,17α-hexylidenedioxy-oestra-1,3,5(10)-triene 3-acetate
sodium 14α, 17α-hexylidenedioxy-oestra-1,3,5(10)-triene 3-yl sulfate
3-hydroxy-14α, 17α-hexylidenedioxy-oestra-1,3,5(10)-triene 3- (1-phenyl-1H-Tetrazolyl)ether
14α, 17α-hexylidenedioxy-oestra-1,3,5(10)-triene
3-methoxy-14α, 17α-ethylidenedioxy-oestra-1,3,5(10),9(11)-tetraene
3-methoxy-6α and 6β-hydroxy-14α, 17α-ethylidenedioxy-oestra-1,3,5(10)-triene
3-methoxy-14α, 17α-ethylidenedioxy-oestra-1,3,5(10)-triene-6-one
3-methoxy-6α and 6α-hydroxy, 14α, 17α-hexylidenedioxy-oestra-1,3,5(10)-triene
3-methoxy-14α, 17α-hexylidenedioxy-oestra-1,3,5(10),triene-6-one
3-hydroxy-14α, 17α-hexylidenedioxy-oestra-1,3,5(10),6-tetraene.

The pharmaceutical compositions of the invention comprise at least one oestratriene general formula 1 and a pharmaceutically acceptable carrier or diluent. The compositions may take any of the forms customarily employed for administration of therapeutically active substances, but the preferred types are those suitable for oral administration, especially tablets, including sustained release tablets, pills and capsules, and those suitable for parenteral administration. The tablets and pills may be formulated in the usual manner with one or more pharmaceutically acceptable diluents or excipients, and can include lubricants. Capsules made of adsorbable material, such as gelatin, may contain the active substance alone or in a mixture, with a solid or liquid diluent. Liquid preparations may be in the form of suspensions, emulsions, syrups or elixirs of the active substance in water or other liquid media commonly used for making orally acceptable pharmaceutical formulations.

The active substance may also be made up in a form suitable for parenteral administration, i.e. as a suspension or emulsion in sterile water or an organic liquid usually employed for injectable preparations, for example a vegetable oil such as corn or olive oil, or a sterile solution in water or an organic solvent.

For parenteral administration, the daily dosage may be 100 to 250 mg; a suitable concentration for the active compound in an injectable preparation is 100 mg/ml. For oral administration the daily dosage may be 0.1–500 mg.

A suitable pharmaceutical composition of the invention can be prepared by dissolving 8g of 3-hydroxy-14α, 17α-hexylidenedioxyoestra-1,3,5(10)-triene in 1 l of purified corn oil and filtering the solution obtained. Soft gelatine capsules are then filled each with 0.25 ml of this solution.

The following Examples illustrate the preparation of the new oestratrienes of the present invention.

EXAMPLE I a. To a solution of 20 g of 14α,17α,21-trihydroxy-pregn-4-ene-3,20-dione in a mixture of 300 ml of tetrahydrofuran and 45 ml of water was added a solution of 19.5 g of periodic acid ($H_5IO_6$) in 78 ml of water at such a rate that the addition was completed in about 15 minutes. The mixture was kept at 25°C for 2.5 hours; then 280 ml of water were added and the mixture was concentrated in vacuo. The crystals formed were collected, washed with water and dried in vacuo. Yield 17.5 g of 14α,17α-dihydroxy-androst-4-en-3-one-17β-carboxylic acid. Melting point: 200c 205°C. I.R. (in KBr): $v_{max} = 3320, 2650, 2580, 1725. 1660, 1619$ and 1193 $cm^{-1}$.

b. A suspension of 200 g of 14α,17α-dihydroxy-androst-4-en-3-one-173-carboxylic acid in 10 l of methylene chloride, 200 g of paraformaldehyde and 200 ml of 70 percent perchloric acid was thoroughly stirred for half an hour. The organic layer was washed until neutral, concentrated and diluted with 8 l of methyl isobutyl ketone. After selective extraction with water at pH 5.95 the methyl isobutyl ketone solution was concentrated. The residue after crystallization from acetone yielded 12.1 g of 14α,17α-methylenedioxy-androst-4-en-3-one-17β-carboxylic acid. Melting point: 295.5°–297°C. I.R. (in KBr): $v_{max} = 3425, 2700, 2600, 1722, 1642,$ 1602, 1161 and 1080 $cm^{-1}$. N.M.R. (in $CDCl_3$ + some DMSO): δ = 0.93, 1.18, 5.03(rboad) and 5.67 ppm.

c. 10 g of 14α,17α-methylenedioxy-androst-4-en-3-one-17β-carboxylic acid were dissolved in 350 ml of dimethylformamide and during 1 hour nitrogen was bubbled through this solution. The temperature was brought up to 120°C and 76 g of lead tatraacetate were added. After half an hour the dimethylformamide was distilled from the reaction mixture and the residue diluted with methyl isobutyl ketone, washed with 5 percent aqueous perchloric acid, concentrated sodium carbonate solution and water until neutral. The solvent was removed by distillation and the residue purified by column chromatography (silicagel, eluent: benzene). After crystallization from acetone 2.9 g of 14α,17α-methylenedioxy-androst-4-en-3-one, were obtained. Melting point: 189° – 191°C. I.R. (in $CHCl_3$): $v_{max} = 2780, 1663, 1614, 1162, 1083$ and 1018 $cm^{-1}$. N.M.R. (in $CDCl_3$): δ = 0.87, 1.20, 4.0(broad), 5.02 (AB-quadruplet) and 5.78 ppm.

d. 100 ml of a suspension of 2.73 g of 14α,17α-methylenedioxy-androst-4-en-3-one in water, prepared by shaking the steroid and water with glass-beads for 16 hours, were added to a fermentation fluid consisting of 15 l of water and containing 0.4 g per liter of formaldehyde and 4 g per liter of a concentrated form of the microorganism *Corynebacterium simplex* (paste). After 28 hours of fermentation under aeration and stirring at room temperature the fermentation fluid was extracted twice with 6 l of methyl isobutyl ketone, the organic layer was filtrated and concentrated. The residue after crystallization from acetone yielded 1.87 g of 14α,-17α-methylenedioxy-androsta-1,4-dien-3-one. Melting point: 150° – 152°C. I.R. (in CHCl$_3$): $\nu_{max}$ = 1660, 1619, 1600, 1080, and 883 cm$^{-1}$. N.M.R. (in CDCl$_3$): δ = 0.87, 1.22, 3.9(broad), 4.95 (AB-quadruplet), 6.12, 6.28 and 7.15 (AB-spectrum) ppm.

e. A mixture of 2.4 g of naphthalene, 230 mg of lithium metal and 18 ml of anhydrous tetrahydrofuran was boiled for 1.5 hours while a stream of nitrogen was passed through and the mixture was stirred vigorously. After adding 0.2 ml of diphenylmethane and boiling for another 15 minutes there was added a solution of 1.61 g of 14α,17α-methylenedioxyandrosta-1,4-dien-3-one in 24 ml of tetrahydrofuran all at once. Upon stirring and boiling for 0.5 hour the reaction mixture was worked up by adding water; after steam distillation in order to remove naphthalene and extraction with methyl isobutyl ketone the organic layer was washed with water and concentrated. The residue was purified by column chromatography (silicagel, eluent: benzene) and crystallized from methanol; yield: 0.80 g of 3-hydroxy-14α,17α-methylenedioxy-oestra-1,3,5(10)-triene. Melting point: 207° – 208°C. I.R. (in CHCl$_3$): $\nu_{max}$ = 3600, 1607, 1582, 1493, 1161, 1080 and 1019 cm$^{-1}$. N.M.R. (in CDCl$_3$ + some DMSO-D$_6$): δ = 0.78, 3.9(broad), 5.00(AB-quadruplet), 6.56, 6.64 and 7.15 (AB-spectrum) ppm.

EXAMPLE II a. To a suspension of 10.5 g of 14α,17α-dihydroxy-androst-4-en-3-one-17β-carboxylic acid in 105 ml of dioxane were added 10.5 ml of paraldehyde and 0.1 ml of 70 percent perchloric acid. After 2.5 hours of stirring at room temperature 200 ml of water were added to the reaction mixture and crystals were separated by filtration with suction. After drying there was obtained 10.4 g of pure 14α,17α-ethylidenedioxyandrost-4-en-3-one-17β-carboxylic acid. Melting point: 228° – 230°C. I.R. (in CHCl$_3$): $\nu_{max}$ = 3435, 1770, 1708, 1664 and 1614 cm$^{-1}$. N.M.R. (in CDCl$_3$ + some DMSO-D$_6$): δ = 0.89, 1.22 and 5.68 ppm.

b. According to the procedure described in Example I c) 14α,17α-ethylidenedioxy-androst-4-en-3-one-17β-carboxylic acid was decarboxylated to 14α,17-α-ethylidenedioxy-androst-4-en-3-one. Melting point: 140° – 142.5°C. I.R. (in CHCl$_3$): $\nu_{max}$ = 1665, 1616, 1406 and 1118 cm$^{-1}$. N.M.R. (in CDCl$_3$): δ = 0.83, 1.19, 1.28(doublet), 3.9(broad), 5.13 (quadruplet) and 5.78 ppm.

c. According to the procedure described in Example I d) 14α,17α-ethylidenedioxy-androst-4-en-3-one was converted into 14α,17α-ethylidenedioxy-androsta-1,4-dien-3-one. Melting point: 203° – 204°C. I.R. (in CHCl$_3$): $\nu_{max}$ = 1660, 1620, 1602, 1400, 1112 and 889 cm$^{-1}$. N.M.R. (in CDCl$_3$): δ = 0.85, 1.22, 1.22(doublet), 3.9(broad), 5.12 (quadruplet), 6.12, 6.28 and 7.15(AB-spectrum) ppm.

d. According to the procedure described in Example I e) 14α,17α-ethylidenedixoy-androsta-1,4-dien-3-one was aromatized to 3-hydroxy-14α,17α-ethylidenedioxy-oestra-1,3,5(10)-triene. Melting point: 235° – 240°C. I.R. (in CHCl$_3$): $\nu_{max}$ = 3603, 1609, 1585, 1497, 1401, 1126 and 1097 cm$^{-1}$. N.M.R. (in CDCl$_3$ + some THF + some DMSO): δ = 0.78, 1.28(doublet), 3.95 (broad), 5.22(quadruplet), 6.57, 6.65 and 7.20(AB-spectrum) ppm. Molecular ion peak in mass spectrum: 314. Calculated for C$_{20}$H$_{26}$O$_3$: 314.

EXAMPLE III a. According to the procedure described in Example II a) 14α,17α-dihydroxy-androst-4-en-3-one-17β-carboxylic acid was converted with hexanal into 14α,17α-hexlidenedioxy-androst-4-en-3-one-17β-carboxylic acid. Melting point: 176° – 177°C. N.M.R. (in CDCl$_3$): δ = 0.90(triplet), 1.03, 1.22, 5.03(triplet) and 5.83 ppm.

b. According to the procedure described in Example I c) 14α,17α-hexylidenedioxy-androst-4-en-3-one-17β-carboxylic acid was decarboxylated to 14α,17-α-hexylidenedioxy-androst-4-en-3-one. Melting point: 91.5° – 101.5°C. I.R. (in CHCl$_3$): $\nu_{max}$ = 1665, 1612 and 1109 cm$^{-1}$. N.M.R. (in CDCl$_3$): δ = 0.83, 1.18, 0.89(triplet), 3.93(broad), 4.93 (triplet) and 5.78 ppm.

c. According to the procedure described in Example I d) 14α,17α-hexylidenedioxy-androst-4-en-3-one was microbiologically dehydrogenated to 14α,17α-hexylidenedioxy-androsta-1,4-dien-3-one. Melting point: 125.5° – 126°C. I.R. (in CHCl$_3$): $\nu_{max}$ = 1660, 1620, 1600, 1149, 1103 and 885 cm$^{-1}$. N.M.R. (in CDCl$_3$): δ = 0.87, 1.23, 3.9(broad), 4.92(triplet), 6.13, 6.30 and 7.17(AB-spectrum) ppm.

d. According to the procedure described in Example I e) 14α,17α-hexylidenedioxy-androsta-1,4-dien-3-one was aromatized to 3-hydroxy-14α,17α-hexylidenedioxy-oestra-1,3,5(10)-triene, isolated as an oil. I.R. (in CHCl$_3$): $\nu_{max}$ = 3600, 1607, 1581, 1493, 1148 and 1104 cm$^{-1}$. N.M.R. (in CDCl$_3$): δ = 0.80, 0.88, 4.0(broad), 5.05(triplet), 6.62, 6.68 and 7.27(AB-spectrum) ppm.

EXAMPLE IV a. 5.5 l of nutrient medium consisting of 0.5 percent of glucose and 0.5 percent of corn steep liquor were inoculated with 275 ml of shake culture of *Aspergillus ochraceus*. The microorganism was grown at 26°C with vigorous stirring and aeration. After 24 hours a solution of 1.4 g of 14α,17α-dihydroxy-progesterone in 20 ml of dimethylformamide was added. After 72 hours, the conversion being complete, the culture broth was filtered and the filtrate extracted three times with 1 l of methyl isobutyl ketone. The extract was concentrated under reduced pressure and the residue crystallized from methanol: yield: 0.4 g of 11α,14α,17α-trihydroxyprogesterone. Melting point: 232° – 234.5°C. I.R. (in CHCl$_3$): $\nu_{max}$ = 3608, 3485, 1711, 1665, 1612 and 1350 cm$^{-1}$.

b. To a stirred suspension of 5 g of 11α,14α,17α-trihydroxyprogesterone in 50 ml of pyridine, 1.2 ml of methane sulfonyl-chloride were added dropwise. The reaction mixture was kept at room temperature for 90 minutes and then poured into 750 ml of water; 5.6 g of 11α,14α,17α-trihydroxyprogesterone 11-methane sulfonate were obtained. Melting point: 160° – 161°C. I.R. (in CHCl$_3$): $\nu_{max}$ = 3600, 3505, 1709, 1665, 1610, 1350, 1333, 1170, 921 and 900 cm$^{-1}$.

c. A solution of 5.5 g of 11α,14α,17α-trihydroxyprogesterone 11-methane sulfonate and 5.5 g of lithium chloride in 55 ml of dimethylformamide was kept at 100°C for 30 minutes. To the cooled reaction mixture 20 ml of water were added; after filtration and drying 3.5 g of 14α,17α-dihydroxy-9(11)-dehydroprogesterone were obtained. Melting point: 235° – 241°C. N.M.R. (in CDCl$_3$ + some DMSO-D$_6$): δ = 0.58, 1.34, 2.15, about 4.0, 5.58 and 5.68 ppm. Molecular ion peak in mass spectrum: 344. Calculated for C$_{21}$H$_{28}$O$_4$: 344.

d. A mixture of 10 g of 14α,17α-dihydroxy-9(11)-dehydroprogesterone 6.6 g of selenium dioxide, 2 ml of pyridine and 500 ml of t-butanol was refluxed for 17 hours. The precipitated selenium was removed by filtration, the filtrate diluted with 2.5 ml of methyl isobutyl ketone and washed with N sodium hydroxide solution, 0.5 N sulfuric acid and water. The organic fraction was concentrated and the brown, crystalline residue triturated with 50 ml of methanol; 2.0 g of nearly white 14α,17α-dihydroxy-1,9(11)-bis-dehydroprogesterone were obtained. Melting point: 268° – 272°C. I.R. (in ChCl$_3$): $\nu_{max}$ = 3605, 3560, 3475, 1710, 1662, 1622, 1602 and 1350 cm$^{-1}$.

e. A mixture of 1.0 g of 14α,17α-dihydroxy-1,9(11)-bisdehydroprogesterone, 30 ml of pyridine containing 0.5 ml of water, and 20 g of zinc dust was heated under reflux with stirring for 210 min. After cooling the zinc dust was removed by filtration and washed with methyl isobutyl ketone. The filtrate was concentrated and the residue dissolved in 25 ml of methyl isobutyl ketone and this solution was washed with N sulfuric acid and water. The solvent was evaporated in vacuo and the residue was crystallized from methanol; yield: 0.50 g of 3,14α,17α-trihydroxy-19-nor-pregna-1,3,5(10),9(11)-tetraen-20-one. Melting point: 230° – 235 °C. N.M.R. (in CDCl$_3$ + some DMSO-D$_6$): δ = 0.68, 2.23, 6.23(broad), 6.55, 6.6 and 7.5(AB-spectrum) ppm.

f. A solution of 0.40 g of 3,14α,17α-trihydroxy-19-nor-pregna-1,3,5(10),9(11)-tetraen-20-one in 15 ml of a mixture (1:1) of methanol and methylene chloride was shaken with 10 mg of platinum oxide for 3 hours in a hydrogen atmosphere. After removal of the catalyst by filtration and concentration of the filtrate there was obtained a residue which was purified by column chromatography (silicagel, eluent: a solution of 5 percent acetone in benzene); yield 120 mg of an a-polar and 160 mg of a polar compound. The a-polar compound proved to be 3,14α,17α-trihydroxy-19-nor-9β-pregna-1,3,5(10)-trien-20-one. Melting point: 167° – 169°C. N.M.R. (in CDCl$_3$ + some DMSO-D$_6$): δ = 0.83, 2.21, 6.67, 6.7 and 7.2 (AB-spectrum) ppm. The polar compound proved to be 3,14α,17-α-trihydroxy-19-nor-pregna-1,3,5(10)-trien-20-one (i.e. the 9α-isomer). Melting point: 244° – 248°C. N.M.R. (in CDCl$_3$ + some DMSO-D$_6$): δ = 0.72, 2.23, 6.53, 6.6 and 7.1 (AB-spectrum) ppm.

g. To a suspension of 10 g of 3,14α,17α-trihydroxy-19-nor-pregna-1,3,5(10)-trien-20-one in 250 ml of chloroform and 100 ml of aqueous potassium hydroxide solution (30 percent) 30 ml of dimethyl sulfate were added dropwise under stirring and after 4.5 hours another portion of 25 ml of KOH and 7.5 ml of dimethyl sulfate was added. After 6 hours of reaction the organic layer was washed with dilute hydrochloric acid, sodium bicarbonate and water respectively and dried for 1 night on potassium carbonate. The solvent was removed by distillation in vacuo and the residue crystallized from a mixture of chloroform and heptane; 6.7 g of 3-methoxy-14α,17α-dihydroxy-19-nor-pregna-1,3,5(10)-trien-20-one were obtained. Melting point: 162° – 163°C. I.R. (in CHCl$_3$) $\nu_{max}$ = 3610, 3480, 1710, 1605, 1570, 1490 and 1341 cm$^{-1}$. N.M.R. (in CDCl$_3$): δ = 0.78, 2.29, 3.80, 6.72, 6.78 and 7.28(AB-spectrum) ppm.

h. 1 g Of 3-methoxy-14α,17α-dihydroxy-19-nor-pregna-1,3,5(10)-trien-20-one was dissolved in 10 ml of dioxane and to this solution 10 ml of a solution of 0.7 mol sodium hypobromite in 650 ml of 2.5 N sodium hydroxide were added dropwise. The temperature was kept at 25° – 35°C and after 40 minutes of vigorously stirring 7 ml of a solution of 2 mol sodium bisulfite per liter were added until the yellow colour disappeared. The reaction mixture was concentrated in vacuo and to the residue water was added. After extraction with methyl isobutyl ketone the water layer was acidified and again extracted with methyl isobutyl ketone. The solvent was removed by distillation in vacuo and after crystallization of the residue from methanol/water 0.85 g of 3-methoxy-14α,17α-dihydroxy-oestra-1,3,5(10)-triene-17β-carboxylic acid were obtained. Melting point: 145° – 147°C. I.R. (in CHCl$_3$): $\nu_{max}$ = 3610, 3400, 2840, 1769, 1710, 1608, 1170 and 1495 cm$^{-1}$. N.M.R. (in CDCl$_3$ + some DMSO-D$_6$): δ = 0.83, 3.79, 6.68, 6.75 and 7.28 (AB-spectrum) ppm.

i. According to procedure described in Example II a) 2.0 g of 3-methoxy-14α,17α-dihydroxy-oestra-1,3,5(10)-triene-17β-carboxylic acid were converted with paraldehyde into 3-methoxy-14α,17α-ethylidenedioxy-oestra-1,3,5(10)-triene-17β-carboxylic acid (yield 2.0 g). Melting point: 171° – 174°C. I.R. (in CHCl$_3$): $\nu_{max}$ = 3435, 1772, 1710, 1609, 1573, 1498, 1402, 1348 and 1109 cm$^{-1}$.

j. According to the procedure described in Example I c) 16.0 g of 3-methoxy-14α,17α-ethylidenedioxy-oestra-1,3,5(10)-triene-17β-carboxylic acid were decarboxylated. After separation by column chromatography (silicagel, eluent: benzene) and crystallization from methanol the following products were obtained: 7.8 g of 3-methoxy-14α,17α-ethylidenedioxy-oestra-1,3,5(10)-triene. Melting point: 124° – 125°C. I.R. (in CHCl$_3$): $\nu_{max}$ = 1603, 1570, 1493 and 1090 cm$^{-1}$. N.M.R. (in CDCl$_3$): δ = 0.80, 1.32(doublet), 3.80, 4.0(broad), 5.23 (quadruplet), 6.70, 6.78 and 7.34(AB-spectrum) ppm, and 0.8 g of a mixture of 3-methoxy-6α- and 6β-acetoxy-14α,17α-ethylidenedioxy-oestra-1,3,5(10)-triene. I.R. (in CHCl$_3$): $\nu_{max}$ = 1720, 1608, 1497, 1399 and 1120 cm$^{-1}$. N.M.R. (in CDCl$_3$): δ = 0.80, 0.84, 1.32(doublet), 2.08, 2.14, 3.80, 4.0 (broad), 5.19(quadruplet), 6.1(broad), 6.9(multiplet) and 7.3 (multiplet) ppm.

EXAMPLE V a. According to the procedure described in Example

IV g) 10.0 g of 3,14α,17α-trihydroxy-19-nor-9β-pregna-1,3,5(10)-trien-20-one were reacted with dimethyl sulfate in chloroform and water, using sodium hydroxide instead of potassium hydroxide. The yield was 4.4 g of 3-methoxy-14α,17α-dihydroxy-19-nor-9β-pregna-1,3,5(10)-trien-20-one. Melting point: 129° – 133°C. N.M.R. (in $CDCl_3$): δ = 0.83, 2.22, 3.80, 6.81, 6.87 and 7.40 (AB-spectrum) ppm.

b. According to the procedure described in Example IV h) 43.0 g of 3-methoxy-14α,17α-dihydroxy-19-nor-9β-pregna-1,3,5(10)-trien-20-one were converted into 3-methoxy-14α,17α-dihydroxy-9β-oestra-1,3,5(10)-triene-17β-carboxylic acid. After purification by selective extraction with a sodium hydroxide solution at pH 6.8 and crystallization from benzene 27.4 g of 3-methoxy-14α,17α-dihydroxy-9β-oestra-1,3,5(10)-triene-17β-carboxylic acid were obtained. Melting point: 150°C (dec.) I.R. (in KBr): $ν_{max}$ = 3565, 3455, 2615, 1700, 1610, 1572, 1487, 1260, 1243 and 1230 $cm^{-1}$.

c. According to the procedure described in Example II a) 23.5 g of 3-methoxy-14α,17α-dihydroxy-9β-oestra-1,3,5(10)-triene-17β-carboxylic acid were converted with paraldehyde into 3-methoxy-14α,17α-ehtylidenedioxy-9β-oestra-1,3,5(10)-triene-17β-carboxylic acid; yield 9.5 g. Melting point: 255° – 256°C.

d. According to the procedure described in Example I c) 4.0 g of 3-methoxy-14α,17α-ethylidenedioxy-9β-oestra-1,3,5(10)-triene-17β-carboxylic acid were decarboxylated to 3-methoxy-14α,17α-ethylidenedioxy-9β-oestra-1,3,5(10)-triene (yield 280 mg of an oil). I.R. (in $CHCl_3$): $ν_{max}$ = 2842, 1629, 1602, 1578, 1490, 1399 and ± 1115 $cm^{-1}$. N.M.R. (in $CDCl_3$): δ = 0.77(doublet), 0.90, 3.76, 3.8(broad), 4,8(quadruplet), 6.55, 6.63 and 7.15(AB-spectrum) ppm.

EXAMPLE VI a. According to the procedure described in Example II a) 8 g of 3-methoxy-14α,17α-dihydroxy-oestra-1,3,5(10)-triene-17β-carboxylic acid were converted with n-pentanal into 3-methoxy-14α,17α-pentylidenedioxy-oestra-1,3,5(10)-triene-17β-carboxylic acid (yield 7.5 g). Melting point: 135° – 136°C. I.R. (in $CHCl_3$): $ν_{max}$=±3430, 1770, 1710, 1608, 1572, 1496, and 1102 $cm^{-1}$.

b. According to the procedure described in Example I c) 7.5 g of 3-methoxy-14α,17α-pentylidenedioxy-oestra-1,3,5(10)-triene-17β-carboxylic acid were decarboxylated with lead tetraacetate. After crystallization from methanol/water 3.4 g of 3-methoxy-14α,17α-pentylidenedioxy-oestra-1,3,5(10)-triene were obtained. Melting point: 71° – 73°C. I.R. (in $CHCl_3$): $ν_{max}$ = 2843, 1607, 1573, 1495, 1149 and 1100 $cm^{-1}$. N.M.R. (in $CDCl_3$): δ = 0.78, 0.88, 3.72, 3.9(broad), 4.93(triplet), 6.58, 6.63 and 7.17(AB-spectrum) ppm.

EXAMPLE VII a. According to the precedure described in Example II a) 8 g of 3-methoxy-14α,17α-dihydroxy-oestra-1,3,5(10)-triene-17β-carboxylic acid were converted with n-hexanal into 3-methoxy-14α,17α-hexylidenedioxy-oestra-1,3,5(10)-triene-17β-carboxylic acid (yield 7.4 g). Melting point: 136° – 137°C. I.R. (in $CHCl_3$): $ν_{max}$ = 3435, 1770, 1710, 1609, 1573, 1498, 1350 and 1109 $cm^{-1}$.

b. According to the procedure described in Example I c) 7.4 g of 3-methoxy-14α,17α-hexylidenedioxy-oestra-1,3,5(10)-triene-17β-carboxylic acid were decarboxylated. After crystallization from methanol/water 4.3 g of 3-methoxy-14α,17α-hexylidenedioxy-oestra-1,3,5(10)-triene were obtained. Melting point: 79° – 80°C. I.R. (in KBr): $ν_{max}$ = 2832, 1603, 1572, 1493, 1252, 1143 and 1104 $cm^{-1}$. N.M.R. (in $CDCl_3$): δ = 0.78, 0.87, 3.72, 3.9(broad), 4.93(triplet), 6.55, 6.65 and 7.18(AB-spectrum) ppm.

EXAMPLE VIII a. According to the procedure described in Example II a) 13 g of 3-methoxy-14α,17α-dihydroxy-oestra-1,3,5(10)-triene-17β-carboxylic acid were converted with benzaldehyde into 3-methoxy-14α,17α-benzylidenedioxy-oestra-1,3,5(10)-triene-17β-carboxylic acid (yield 14.4 g). Melting point: 195° – 196°C. I.R. (in $CHCl_3$): $ν_{max}$ = 3445, 1770, 1710, 1610, 1573, 1495, 1350 and 1095 $cm^{-1}$.

b. According to the procedure described in Example I c) 14 g of 3-methoxy-14α,17α-benzylidenedioxy-oestra-1,3,5(10)-triene-17β-carboxylic acid were decarboxylated. After crystallization from methanol/water 1.5 g of 3-methoxy-14α,17α-benzylidenedioxy-oestra-1,3,5(10)-triene were obtained. Melting point: 152° – 153°C. I.R. (in KBr): $ν_{max}$ = 3090, 3070, 3035, 2830, 1608, 1573, 1495, 1250, 1088, 743 and 690 $cm^{-1}$. N.M.R. (in $CDCl_3$): δ = 0.84, 3.70, 4.1(broad), 5.89, 6.55, 6.63(doublet) and 7.1–7.6(multiplet) ppm.

EXAMPLE IX a. To a solution of 2.1 g of 14α,17α-dihydroxy-androst-4-en-3-one-17β-carboxylic acid in 20 ml of acetone, 0.72 g of phenylboronic acid were added. After 5 minutes the precipitated crystals were filtered and crystallized from benzene; 1.75 g of 14α,17α-phenylloxylenedioxy-androst-4-en-3-one-178β-carboxylic acid were obtained. Melting point: 243° – 244°C (dec.) I.R. (in $CHCl_3$):$ν_{max}$= 3440, 1770, 1710, 1660, 1610, 1598, 1489, ca. 1320 and 1100 $cm^{-1}$.

b. According to the procedure described in Example I c) 15.6 g of 14α, 17α-phenylborylenedioxy-androst-4-en-3-one-17β-carboxylic acid were decarboxylated; 5.8 g of 14α,17α-phenylborylenedioxy-androst-4-en-3-one were obtained. Melting point: 248° – 252°C. I.R. (in $CHCl_3$):$ν_{max}$= 1667, 1620, 1602, 1495, 1330, 1105 and 645 $cm^{-1}$.

c. 16 g of 14α,17α-phenylborylenedioxy-androst-4-en-3-one were dissolved in 28 ml of acetone and 28 ml of aqueous 5 N potassium hydroxide solution. After 30 minutes of boiling the upper layer was separated, concentrated, diluted with benzene and washed until neutral. After evaporation of the solvent the residue was crystallized from heptane and 6 g of 14α,17α-dihydroxy-androst-4-en-3-one were obtained. Melting point: 209° – 211°C. I.R. (in $CHCl_3$):$ν_{max}$= 3615, ±3510, 1665, 1615 and 1018 $cm^{-1}$.

d. According to the procedure described in Example I d) a suspension of 25 g of 14α,17α-dihydroxy-androst-4-en-3-one in water was fermented with the microorganism *Corynebacterium simplex* From the fermentation fluid 18 g of 14α,17α-dihydroxy-androsta-1,4-dien-3-one were isolated. Melting point: 230°-232°C. I.R. (in CHCl$_3$):$\nu_{max}$= 3609, ± 3490, 1660, 1620, 1603 and 890 cm$^{-1}$.

e. To a suspension of 4.0 g of 14α,17α-dihydroxy-androsta-1,4-dien-3-one in 60 ml of dioxane 10 ml of hexahydrobenzaldehyde and 0.2 ml of 70% perchloric acid were added. After 30 minutes 200 ml of water and dilute sodium hydrogen carbonate solution were added until neutral. The mixture was extracted with methylene chloride, the exact concentrated and the residue crystallized from acetone. The yield was 4.5 of 14α,17α-cyclohexylmethylenedioxy-androsta-1,4-dien-3-one. Melting point: 225° - 226°C. I.R. (in KBr):$\nu_{max}$= 3048, 1660, 1622, 1600, 1019 and 882 cm$^{-1}$.

f. According to the procedure described in Example I e) 560 mg of 14α, 17α-cyclohexylmethylenedioxy-androsta-1,4-dien-3-one were aromatized to 3-hydroxy-14α,17α-cyclohexylmethylenedioxy-oestra-1,3,5(10)-triene, isolated as an oil (yield 2.90 mg). I.R. (in KBr):$\nu_{max}$=±3350, 3060, 3020, 1610, 1582, 1501 and ±1215 cm$^{-1}$. N.M.R. (in CDCl 3):δ = 0.81, 3.9(broad), 4.7(broad), 6.53, 6.6 and 7.7 (AB-spectrum) ppm.

EXAMPLE X a. According to the procedure described in Example IX e) 4 g of 14α,17α-dihydroxy-androsta-1,4-dien-3-one were converted with 2-methylpropanal into 4 g of 14α,17α-[2-methylpropylidene]dioxy-androsta-1,4-dien-3-one. Melting point: 163°-164°C. I.R. (in KBr):$\nu_{max}$= 3045, 1645, 1618, 1599, 1089 and 891 cm$^{-1}$.

b. According to the procedure described in Example I e) 550 mg of 14α, 17α-[2-methylpropylidene]dioxy-androsta-1,4-dien-3-one were aromatized to 3-hydroxy-14α,17α-[2-methylpropylidene]dioxy-oestra-1,3,5(10)-triene, (yield 250 mg). Metlting point: 235° - 237°C. I.R.-.(in KBr):$\nu_{max}$= 3422, 3353, 3065, 3024, 1608, 1503, 1215 and 1088 cm$^{-1}$. N.M.R. (in CDCl$_3$ + DMSO): δ=0.80, 0.87, 0.98, 3.9(broad), 4.65 (doublet), 6.50, 6.57 and 7.11 (AB-spectrum) ppm.

EXAMPLE XI a. According to the procedure described in Example IX e) 13.6 g of 14α, 17α-dihydroxy-androsta-1,4-dien-3-one were converted with n-hexanal into 16.5 g of 14α,17α-hexylidenedioxy-androsta-1,4-dien-3-one. Melting point: 125° - 126°C. I.R. (in CHCl$_3$):$\nu_{max}$=1660, 1620, 1600, 1149, 1103 and 885 cm$^{-1}$. N.M.R. (in CDCl$_3$):δ = 0.87, 1.23, 3.9(broad), 4.92(triplet), 6.13, 6.30 and 7.17 (AB-spectrum) ppm.

b. According to the procedure described in Example I e) 16.5 g of 14α,17α-hexylidenedioxy-androsta-1,4-dien-3-one were aromatized to 3-hydroxy-14α,17α-hexylidenedioxy-oestra-1,3,5(10)-triene, isolated as an oil (yield 10.6 g). I.R. (in CHCl$_3$):$\nu_{max}$= 3600, 1607, 1581, 1493, 1148 and 1104 cm$^{-1}$. N.M.R. (in CDCl$_3$):δ= 0.80, 0.88, 4.0(broad), 5.05(triplet), 6.62, 6.68 and 7.27 (AB-spectrum) ppm.

EXAMPLE XII a. According to the procedure described in Example IX e) 4 g of 14α,17α-dihydroxy-androsta-1,4-dien-3-one were converted with n-decanal into 4.8 g of 14α,17α-decylidenedioxy-androsta-1,4-dien-3-one. Melting point: 108° - 109°C. I.R. (in KBr):$\nu_{max}$= 3046, 1655, 1618, 1599, 1115 and 880 cm$^{-1}$.

b. According to the procedure described in Example I e) 550 mg of 14α,17α,decylidenedioxy-androsta-1,4-dien-3-one were aromatized to 3-hydroxy-14α,17α-decylidenedioxy-oestra-1,3,5(10)-triene, isolated as an oil (yield 350 mg). I.R. (in KBr):$\nu_{max}$= ± 3380, 3060, 3020, 1610, 1583, 1500, 1150 and 1110 cm$^{-1}$. N.M.R. (in CDCl$_3$):δ=0.79, 1.25, 3.9(broad), 4.9(broad), 6.52, 6.60 and 7.13 (AB-spectrum) ppm.

EXAMPLE XIII a. According to the procedure described in Example IX a) 1 g of 3-methoxy-14α,17α-dihydroxy-oestra-1,3,5(10)-triene 17β-carboxylic acid was converted with phenylboronic acid into 3-methoxy-14α,17α-phenylborylenedioxy-oestra-1,3,5(10)-triene-17β-carboxylic acid (yield 1.1 g). Melting point: 229° - 230°C. I.R. (in CHCl$_3$): $\nu_{max}$=± 3440, 1770, 1709, 1600, 1570, 1492, 1435, 1343, 1319 and 1100 cm$^{-1}$.

b. According to the procedure described in Example I c) 1 g of 3-methoxy-14α,17α-phenylborylenedioxy-oestra-1,3,5(10)-triene-17β-carboxylic acid was decarboxylated. After separation by column chromatography on silicagel (eluent: benzene) and crystallization from acetone/water and methanol/water respectively the following products were obtained: 0.3 g of 3-methoxy-14α,17α-phenylborylenedioxy-oestra-1,3,5(10)-triene. Melting point: 147° - 149°C. I.R. (in Kbr):$\nu_{max}$= 3080, 3053, 3036, 1605, 1599, 1570, 1490, 1433, 1323, 1095 and 697 cm$^{-1}$, and 60 mg of a mixture of 3-methoxy-6α and 6β-acetoxy-14α,17α-phenylborylenedioxy-oestra-1,3,5(10)-triene. I.R. (in KBr):$\nu_{max}$= 3078, 3053, 3020, 1760, 1730, 1610, 1598, 1570, 1500, 1436, 1324, 1230 and 693 cm$^{-1}$.

c. According to the procedure described in Example IX c) 48 g of 3-methoxy-14α,17α-phenylborylenedioxy-oestra-1,3,5(10)-triene were hydrolyzed to 3-methoxy-14α,17α-dihydroxy-oestra-1,3,5(10)-triene (yield after crystallization from methanol/water 22.9 g). Melting point: 157° - 158°C. I.R. (in CHCl$_3$): $\nu_{max}$= 3612, ± 3410, 2843, 1608, 1572 and 1492 cm$^{-1}$.

d. According to the procedure described in Example II a) 5 g of 3-methoxy-14α,17α-dihydroxy-oestra-1,3,5(10)-triene were converted with p-nitrobenzaldehyde into 3-methoxy-14α,17α-[4'-nitro-benzylidene]dioxy-oestra-1,3,5(10)-triene (yield 5.2 g). Melting point: 151° - 152°C. I.R. (in KBr):$\nu_{max}$= 3120, 3090, 2832, 1605, 1570, 1528, 1493, 1343, 1110 and 1080 cm$^{-1}$. N.M.R. (in CDCl$_3$):δ=0.88, 3.73, 4.1(broad), 5.97, 6.60, 6.67 and 7.20 (AB-spectrum), 7.63 and 8.13 (AB-spectrum) ppm.

EXAMPLE XIV

A mixture of 5 g of 3-methoxy-14α,17α-dihydroxy-oestra-1,3,5(10)-triene, 20 ml of dioxane, 10 ml of furfural and 1.8 g of phosphorous pentoxide was stirred for 24 hours at room temperature. After extraction with ethyl acetate the organic layer was washed respectively with dilute sodium hydrogen carbonate solution, a concentrated sodium bisulfite solution (50 percent) and water. The solvent was distilled in vacuo and the residue purified by chromatography on silicagel (eluent: benzene). After crystallization from ethyl acetate/methanol 3.4 g of 3-methoxy-14α,17α -[2-furfurylidene]dioxy-oestra-1,3,5(10)-triene were obtained. Melting point: 143° – 144°C. I.R. (in KBr): $\nu_{max}$= 3125, 3045, 3015, 2840, 1730, 1610, 1570, 1490, 1255 and 1148 cm$^{-1}$. N.M.R. (in CDCl$_3$): δ = 0.83, 3.71, 4.0(broad), 5.93, 6.3(multiplet), 6.53, 6.63 and 7.2 (AB-spectrum), 7.3(multiplet) ppm.

EXAMPLE XV

According to the procedure described in Example XIV 4 g of 3-methoxy-14α,17α-dihydroxy-oestra-1,3,5(10)-triene were converted with thiophene-2-aldehyde to 3-methoxy-14α,17α-[2-thienylmethylene]dioxy-oestra-1,3,5(10)-triene (yield 3.6 g). Melting point: 157°– 158°C. I.R. (in KBr):$\nu_{max}$= 3120, 3090, 2832, 1605, 1570, 1528, 2493, 1343, 1253, 1110 and 1080 cm$^{-1}$. N.M.R. (in CDCl$_3$): δ= 0.82, 3.70, 4.0(broad), 6.13, 6.55 and 6.6–7.4 (multiplet) ppm.

EXAMPLE XVI

According to the procedure described in Example XIV 4 g of 3-methoxy-14α, 17α-dihydroxy-oestra-1,3,5(10)-triene were converted with naphthalene-1-aldehyde to 3-methoxy-14α,17α-[1-naphthylmethylene]dioxy-oestra-1,3,5 (10)-triene (yield 5.0 g). Melting point: 220° – 223°C. I.R. (in KBr):$\nu_{max}$= 3075, 3068, 3014, 2833, 1609, 1570, 1490, 1255 and 1108 cm$^{-1}$. N.M.R. (in CDCl$_3$):δ = 0.89, 3.75, 4.2(broad), 6.61, 6.7(doublet) and 7.0–8.2-(multiplet) ppm.

EXAMPLE XVII

According to the procedure described in Example XIV 4 g of 3-methoxy-14α,17α-dihydroxy-oestra-1,3,5(10)-triene were converted with 3,4,5-trimethoxy-benzaldehyde to 3-methoxy-14α,17α-[3',4',5'-trimethoxy benzylidene]dioxy-oestra-1,3,5(10)-triene (yield 4 g of an oil). I.R. (in CHCl$_3$):$\nu_{max}$= 2840, 1596, 1496, 1460, 1385 and 1128 cm$^{-1}$. N.M.R. (in CDCl$_3$): δ=0.87, 3.8(multiplet), 4.1(broad), 5.87, 6.61, 6.78, 6.70 and 7.23 (AB-spectrum) ppm.

EXAMPLE XVIII

According to the procedure described in Example XIV 250 mg of 3-methoxy-14α,17α-dihydroxy-oestra-1,3,5(10)-triene were converted with adamantane-1-carboxaldehyde to 3-methoxy-14α,17α-[1-adamantylmethylene]dioxy-oestra-1,3,5(10)-triene (yield 115 mg). Melting point: 93° – 96°C. I.R. (in CHCl$_3$):$\nu_{max}$= 1608, 1572, 1493 and 1080 cm$^{-1}$. N.M.R. (in CDCl$_3$): δ = 0.80, 1.67, 3.77, 3.9(broad), 4.33, 6.63, 6.70, and 7.25 (AB-spectrum) ppm.

EXAMPLE XIX

According to the procedure described in Example II
a) 500 mg of 3-methoxy-14α,17α-dihydroxy-oestra-1,3,5(10)-triene were converted with crotonaldehyde into 3-methoxy-14α,17α-[2-butenylidene]dioxy-oestra-1,3,5(10)-triene (yield 311 mg). Melting point: 92°– 94°C. I.R. (in KBr):$\nu_{max}$= 1683, 1610, 1574, 1500, 1256, 1150, 1108 and 1038 cm$^{-1}$. N.M.R. (in CDCl$_3$):δ= 0.80, 1.71(doublet), 3.73, 3.9(broad), 5.2-6.2 (multiplet), 6.58, 6.65 and 7.20 (AB-spectrum) ppm.

EXAMPLE XX a. According to the procedure described in Example IV g) 5.5 g of 3,14α-dihydroxy-oestra-1,3,5(10)-trien-17-one were converted into 3-methoxy-14α-hydroxy-oestra-1,3,5(10)-triene-17-one (yield 13.4 g after crystallization from methanol). Melting point: 124° – 128°C. I.R. (in CHCl$_3$): $\nu_{max}$=3610, 1740, 1610, 1574, 1495 and 1033 cm$^{-1}$.

b. A mixture of 3.5 go of 3-methoxy-14α-hydroxy-oestra-1,3,5(10)-trien-17-one, 3 ml of hydrazine hydrate and 35 ml of ethyl alcohol was boiled for 2 hours. After dilution with water, filtration and drying of the product 3.6 g of 3-methoxy114α-hydroxy-oestra-1,3,5(10)-trien-17-one 17-hydrazone were obtained. Melting point 157°–159°C. I.R. (in CHCl$_3$):$\nu_{max}$= 3608, 3393, 1665, 1609, 1573, 1495 and 1032 cm$^{-1}$.

c. To a mixture of 3.3 g of 3-methoxy-14α-hydroxy-oestra-1,3,5(10)-trien-17-one 17-hydrazone, 165 ml of tetrahydrofuran and 82.5 ml of triethylamine under nitrogen a solution of 5.9 g of iodine in 16.5 ml of tetrahydrofuran was added dropwise. After 30 minutes the solvent was removed by distillation in vacuo and the residue dissolved in methyl isobutyl ketone and washed with respectively dilute hydrochloric acid, water, dilute sodium thiosulfate solution and water. The solvent was removed by distillation in vacuo and the residue crystallized from methanol. 2.9 g of 3-methoxy-14α-hydroxy-17-iodo-oestra 1,3,5(10), 16-tetrane were obtained. Melting point: 164° – 166°C. I.R. (in CHCl$_3$):$\nu_{max}$= 3590, 3575, 1608, 1570 and 1494 cm$^{-1}$.

d. To a stirred solution of 2.8 g of 3-methoxy-14α-hydroxy-17-iodo-oestra-1,3,5(10),16-tetranene in 164 ml of ethanol, 20 g of sodium (in pieces) were added. After 1¼ hours boiling the mixture was diluted with water and extracted with methyl isobutyl ketone. The organic layer was washed with dilute hydrochloric acid and water and the solvent was evaporated. After crystallization from methanol 1.3 g of 3-methoxy-14α-hydroxy-oestra-1,3,5(10), 16-tetrane were obtained. Melting point: 78°–84°C. I.R. (in CHCl$_3$):$\nu_{max}$= 3570, 1608, 1570, 1494 and 1032 cm$^{-1}$.

e. To a stirred mixture of 960 mg of 3-methoxy114α-hydroxy-oestra-1,3,5(10),16-tetrane, 960 mg of anhydrous sodium acetate, 4.8 ml of benzene and 4.8 ml of ethyl acetate 3 ml of a solution of m-chloro-perbenzoic acid (40% in ethyl acetate) were added dropwise. After 30 minutes the mixture was diluted with ethyl acetate and washed with dilute aqueous potassium carbonate solution and water. The solvent was removed by distillation in vacuo and the residue crystallized from methanol. 630 mg of 3-methoxy-14α-hydroxy-16α,17α-epoxy-oestra-1,3,5(10)-triene were obtained. Melting point: 133° – 134°C. I.R. (in CHCl$_3$):$\nu_{max}$= 3465, 1608, 1573, 1493 and 1038 cm$^{-1}$. N.M.R. (in CDCl$_3$): δ = 0.88, 3.37 and 3.60(AB-spectrum), 3.73 and 6.6–7.2(multiplet)ppm.

f. To a stirred mixture of 250 mg of lithium aluminum hydride and 7.5 ml of anhydrous ethyl ether a solution of 550 mg of 3-methoxyl14α-hydroxy-16α,17α-epoxy-oestra-1,3,5(10)-triene in 12.5 ml of anhydrous tetrahydrofuran was added dropwise and the mixture boiled for 2.5 hours. Excess lithium aluminum hydride was destroyed by the careful addition of methyl isobutyl ketone and then more of this solvent was added to extract the mixture. The organic layer was wahed with 6 N sulfuric acid, dilute potassium carbonate solution and water. After removal of the solvent by distillation in vacuo and crystallization of the residue from methanol 440 mg of 3-methoxy-14α,17α-dihydroxy-oestra-1,3,5 (10)-triene were obtained. Melting point 158° – 161°C. I.R. (in CHCl$_3$):$\nu_{max}$= 3612, 3410, 2843, 1608, 1572 and 1492 cm$^{-1}$.

g. According to the procedure described in Example IX e) 200 mg of 3-methoxy-14α,17α-dihydroxy-oestra-1,3,5(10)-triene were converted with paraldehyde into 3-methoxy-14α,17α-ethylidenedioxy-oestra-1,3,5(10)triene (yield after cystallization from methanol 170 mg). Melting point: 128° – 130°C. I.R. (in CHCl$_3$):$\nu_{max}$= 1603, 1570, 1493 and 1090 cm$^{-1}$. N.M.R. (in CDCl$_3$): δ =0.80, 1.30(doublet), 3.75, 3.9(broad), 5.14 (quadruplet), 6.59 and 6.5-7.4(multiplet) ppm.

EXAMPLE XXI

A mixture of 1.2 g of 3-hydroxy-14α,17α-hexylidenedioxy-oestra-1,3,5(10)-triene, 20 ml of hexamethyl phosphoric triamide, 0.9 g of sodium hydride dispersion (50%; in oil) and 2.2 g of isopropyl iodide was stirred for 24 hours at 30°C. After dilution with water and extraction with methylene chloride the organic layer was washed with water until neutral. The solvent was evaporated and the residue purified by chromatography on silicagel (eluent: heptane benzene). After crystallization from methanol 670 mg of 3-hydroxy-14α,17α-hexlidenedioxy-oestra-1,3,5(10)-triene 3-isopropyl ether were obtained. Melting point: 62° – 65°C. I.R. (in CHCl$_3$):$\nu_{max}$= 1602, 1567, 1490, 1380, 1150 and 1108 cm$^{-1}$. N.M.R. (in CDCl$_3$): δ= 0.79, 0.87, 1.30(doublet), 3.9(broad), 4.41(quadruplet), 4.92(triplet), 6.57, 6.63 and 7.16 (AB-spectrum) ppm.

EXAMPLE XXII

According to the procedure described in Example XXI 1.5 g of 3-hydroxy-4α,17α-hexylidenedioxy-oestra-1,3,5(10)-triene were converted with allyl bromide to 3-hydrosy-14α,17α-hexylidenedioxy-oestra 1,3,5(10)-triene 3-allylether (yield 0.9 g). Melting point: 83° –84°C. I.R. (in KBr):$\nu_{max}$= 3012, 1645, 1607, 1569, ± 1495, 1250, 1149, 1128 and 1100 cm$^{-1}$. N.M.R. (in CDCl$_3$):δ = 0.79, 0.87, 3.9(broad), 4.47(multiplet), 493(triplet), 5.1–6.4(multiplet), 6.60, 6.68 and 7.22 (AB-spectrum) ppm.

EXAMPLE XXIII

A mixture of 3.7 g of 3-hydroxy-14α,17α-hexylidenedioxy-oestra-1,3,5(10)-triene, 3.6 g of sodium hydride dispersion (50 percent; in oil), 50 ml of hexamethyl phosphoric triamide and 5.8 g of 2-dimethylaminoethyl chloride hydrochloride was stirred for 7 hours. After dilution with water the reaction mixture was extracted with methylene chloride and washed with water until neutral. The solution was concentrated and the residue purified by column chromatography on silicagel (elution with benzene, chloroform and methanol); 71 mg of 3-hydrosyl14α,17α-hexylidenedioxy-oestra-1,3,5(10)-triene 3-[β-dimethylaminoethyl]ether were obtained as an oil. I.R. (in CHCl$_3$):$\nu_{max}$= 2780, 1603, 1570, 1492 and 1106 cm$^{-1}$. N.M.R. (in CDCl$_3$): ν =0.78, 0.87, 2.35, 3.9(broad),4.03(triplet), 4.9 (broad), 6.57, 6.63 and 7.17 (AB-spectrum) ppm. Molecular ion peak in mass spectrum: 441. Calculated for C$_{29}$H$_{43}$NO$_3$: 441.

EXAMPLE XXIV

A solution of 100 mg of 3-methoxy-14α,17α-ethylidenedioxy-oestra-1,3,5(10)-triene and 200 mg of sodium ethanethiolate in 1.5 ml of N,N-dimethylformamide was boiled for 5 hours. After cooling the mixture was poured out into water, neutralized with dilute hydrochloric acid, the product filtered off and dried; 86 mg of 3-hydroxy-14α,17α-ethyldenedioxy-oestra-1,3,5(10)-triene (iin amorphus form) were obtained. I.R. (in CHCl$_3$): $\nu_{max}$= 3603, 1609, 1585, 1497, 1401, 1126 and 1097 cm$^{-1}$. N.M.R. (in CDCl$_3$ + trace of DMSO-D6):δ= 0.80, 1.28(doublet), 3.9(broad), 5.12(doublet), 6.50, 6.57 and 7.08 (AB-spectrum) ppm.

EXAMPLE XXV a. According to the procedure described in Example XXIV 100 mg of 3-methoxy-14α,17α-dihydroxy-oestra-1,3,5(10)-triene were hydrolyzed to 3,14α,17α-trihydroxy-oestra-1,3,5(10)-triene (yield 25 mg). Melting point: 189° – 192°C. I.R. (in KBr): $\nu_{max}$=3360, 2015, 1603, 1500 and 1233 cm$^{-1}$.

b. According to the procedure described in Example IX e) 20 mg of 3,14α, 17α-trihydroxy-oestra-1,3,5(10)-triene were converted with paraldehyde to 3-hydroxy-14α,17α-ethylidenedioxy-oestra-1,3,5(10)-triene (yield 15 mg). The product thus obtained proved to be identical with the end product of Example II.

EXAMPLE XXVI 5 g of 3-hydroxy-14α,17α-hexylidenedioxy-oestra-1,3,5(10)-triene were dissolved in 70 ml of pyridine and to this solution 4.2 ml of acetyl-chloride were added with vigorous stirring. After 15 minutes the mixture was filtered and the filtrate distributed over water and methylene chloride. The organic layer was washed with N hydrochloric acid and water until neutral. After conventration of the organic layer and purification of the residue by column chromatography on silicagel (elution with heptane and carbon tetrachloride) 4.2 g of 3-hydroxy-14α,17α-hexylidenedioxyoestra-1,3,5(10)-triene 3-acetate were obtained as an oil. I.R. (in CHCl$_3$): $\nu_{max}$=1760, 1745, ± 1603, ± 1588, 1490, 1149 and 1109 cm$^{-1}$. N.M.R. (in CDCl$_3$): δ = 0.79, 0.87, 2.24, 3.9(broad), 4.93(triplet), 6.72, 6.74 and 7.28 (AB-spectrum) ppm.

EXAMPLE XXVII

To 2.4 ml of pyridine 0.9 ml of chlorosulfonic acid were added dropwise at 0°– 10°C with vigorous stirring and exclusion of moist. A solution of 450 mg of 3-hydroxy-14α,17α-hexylidenedioxy-oestra-1,3,5(10)-triene in 6.6 ml of pyridene was added to the mixture after which the temperature was kept for 10 minutes at 70°C. At 35°C 45 ml of saturated sodium chloride solution were added with vigorous stirring. The precipitate was filtered and the filtrate extracted with diethyl ether. The solvent was evaporated and the residue dissolved in water. Dilute sodium bicarbonate solution was added until pH 7.1 and the solution was washed with methylene chloride snd extracted with diethyl ether. The ether was removed byy distillation and 280 mg of sodium 14α,17α-hexlidenedioxyoestra-1,3,5(10)-triene 3-yl sulfate were obtained as an oil. I.R. (in KBr):$\nu_{max}$= ± 3450, ±3060, 1608, 1579, 1492, 1240, 1109 and 1058 cm$^{-1}$. N.M.R. (in DMSO-D$_6$): δ = 0.77, 0.83, 3.9(broad),4.9(broad) and 6.8-7.3(multiplet) ppm. Elementary analysis:

Calculated for C$_{24}$H$_{33}$O$_6$SNa: C 61.02%; H 6.99%; S 6.78%; Na 4.87%. Found: C 61.57%; H 7.29%; S 5.37%; Na 4.17%.

EXAMPLE XXVII.

A mixture of 2.0 g of 3-hydroxy-14α,17α-hexlidenedioxy-oestra-1,3,5 (10-triene, 1.1 g of 1-phenyl5-chloro-1H-tetrazole, 1.5 g of potassium carbonate and 50 ml of acetone was boiled with stirring for 16 hours. After extraction with methyl isobutyl ketone the organic layer was washed with brine until neutral and concentrated in vacuo. After crystallization from methanol 2.0 g of 3-hydroxy-14α,17α-hexylidenedioxy-oestra-1,3,5(10)-triene 3-[1-phenyl-1H-tetrazolyl]ether were obtained. Melting point: 88°–89°C. I.R. (in KBr): $\nu_{max}$= 3075=3060, 1590, ± 1535, 1500, 1485, 759 and 680 cm$^{-1}$. N.M.R. (in CDCl$_3$):δ =0.80, 0.87, 3.9(broad), 4.94(triplet) and 6.9–7.9-(multiplet) ppm.

EXAMPLE XXIX

A solution of 1.0 g of 3-hydroxy-14α,17α-hexylidenedioxy-oestra-1,3,5(10)-triene 3-8 1-phenyl-1H-tetrazolyl]ether in 35 ml of benzene was kept in an hydrogen atmosphere in the presence of 100 mg of palladium-catalyst (10 percent palladium on coal, moistened with water) at a temperature of 45°C with stirring for 60 hours. During this period another 5 portions of 100 mg of catalyst were regularly added. After filtration over dicalite some methyl isobutyl ketone was added to the filtrate and the resulting solution concentrated. The residue was crystallized from methanol; yield: 590 mg of 14α,17α-hexylidenedioxy-oestra-1,3,5(10)-triene. Melting point: 112°– 113°C. I.R. (in KBr):$\nu_{max}$= 3100, 3075, 3063, 3030, 3018, 1598, 1482, 1143, 1102 and 736 cm$^{-1}$. N.M.R. (in CDCl$_3$): δ=0.80, 0.88, 3.9(broad), 4.9(broad) and 6.8–7.6 (multiple) ppm.

EXAMPLE XXX

A mixture of 1 g of 3-methoxy-14α,17α-ethylidenedioxy-oestra-1,4,5(10)-triene, 15 ml of dioxane, 60 ml of t-butanol and 4 g of chloranil was boiled for 23 hours with stirring in a nitrogen atmosphere. After filtration and concentration of the filtrate the residue was dissolved in methylene chloride and washed respectively with dilute sodium hydroxide solution, dilute hydrochloric acid and with N sodium hydrogen carbonate solution and water untill neutral. After removal of the solvent by distillation the residue was purified by column chromatography on silicagel (eluent: benzene). After crystallization from methanol/ water 200 mg of 3-methoxy-14α,17α-ethylidenedioxy-oestra-1,3,5(10),9, (11)-tetraene were obtained. Melting point: 115°– 116°C. I.R. (in KBr): $\nu_{max}$= 3090, 3030, 2835, 1632, 1604, 1569, 1492, 1396, 1250 and 115 cm$^{-1}$. N.M.R. (in CDCl$_3$):δ = 0.78, 1.24(doublet), 3.75, 3.9(broad), 5.10(quadruplet), 6.2(broad), 6.57, 6.6 and 7.54(AB-spectrum) ppm.

EXAMPLE XXXI a. Through a mixture of 15.0 g of 14α,17α-hexylidenedioxy-androsta-1,4-dien-3-one, 600 ml of dioxane (pure) and 10 g of 2,3-dichloro-5.6-dicyano-1,4-benzoquinone a stream of hydrogenchloride was passed until the concentration was 1.25 mole HCl per liter. After 19 hours of stirring with exclusion of moisture at room temperature dilute sodium hydroxide solution was added until neutral. The mixture was stirred with acidified alumina in benzene and upon filtration and concentration of the filtrate a residue was obtained which was purified by column chromatography in silicagel (eluent: benzene). After crystallization from methanol 2.0 g of 14α,17α-hexylidenedioxyandrosta-1,4,6-trien-3-were obtained. Melting point: 112°– 113°C. I.R. (in KBr):$\nu_{max}$= 3038, 1642, 1620, 1599, 1571, and 1103 cm$^{-1}$.

b. According to the procedure described in Example I e) 550 mg of 14α,17α-hexlidenedioxy-androsta-1,4,6-trien-3-one were aromatized to 3-hydroxy-14α,17α-hexylidenedioxy-oestra-1,3,5(10),6-tetrane, isolated as an oil (yield 51 mg). I.R. (in KBr):$\nu_{max}$=± 3340, 3030, 1615, 1575, 1492 and 1108 cm$^{-1}$. N.M.R. (in DCcl$_3$):$\nu$ =0.80, 0.87, 3.9(broad), 5.0(broad), 5.5(broad), 5.95 and 6.4(AB-spectrum), 6.53, 6.59 and 7.1(AB-spectrum) ppm.

EXAMPLE XXXII 790 mg Of the mixture of 3-methoxy-6α and 6β-acetoxy-14α, 17α-ethylidenedioxy-oestra-1,3,5(10)-triene obtained in Example IV j), 8 ml of dioxane and 3 ml of aqueous 2 N potassium hydroxide solution were boiled for 2 hours. The mixture was neutralized with dilute hydrochloric acid and the dioxane was removed by distillation in vacuo. The crystalline residue was filtered and washed with water. After drying 640 mg of a mixture of 3-methoxy-6α and 6β-hydroxy-14α,17α-ethylidenedioxy-oestra-1,3,5(10)-triene were obtained. I.R. (in CHcl$_3$): $\nu_{max}$ =3605, 1608, 1578, 1491, 1400 and 1120 cm$^{-1}$. N.M.R. (in CDCl$_3$): δ = 0.82, 1.30(doublet), 3,67, 3.77, 3.9(broad), 4.7(broad), 5.13(quadruplet) and 6.6–7.4(multiplet) ppm.

EXAMPLE XXXIII 620 mg Of the mixture of 3-methoxy-6α and 6β-hydroxy-14α,17α-ethylidenedioxy-oestra-1,3,5(10)- triene obtained in Example XXXII, were dissolved in 9 ml of chromic trioxyde reagent (prepared by adding 300 mg of chromic trioxyde to 1 ml of water and 9 ml of acetic acid). After 45 minutes of stirring the mixture was neutralized with dilute sodium hydroxide solution and extracted with methyl isobutyl ketone. The organic layer was washed with dilute sodium hydroxide solution and water until neutral and concentrated. After crystallization of the residue from methanol/water 330 mg of 3-methoxy-14α,17α-ethylidenedioxy-oestra-1,3,5(10)-trien-6-one were obtained. Melting point: 100° – 103°C. I.R. (in KBr): $\nu_{max}$ = 3085, 3065, 3040, 2842, 1678, 1605, 1565, 1490, 1398, 1245 and 1120 cm$^{-1}$. N.M.R. (in CDCl$_3$): δ = 0.82, 1.31(doublet), 3.82, 3.9(broad), 5.14(quadruplet), 7.27, 7.11 and 7.50 (AB-spectrum) ppm.

EXAMPLE XXXIV a. According to the procedure described in Example IX c) the mixture of 3-methoxy-6α and 6β-acetoxy-14α,17α-phenylborylenedioxy-oestra-1,3,5(10)-triene obtained in Example XIII b), was hydrolyzed to a mixture of 3-methoxy-6α and 6β,1-4α,17α-trihydroxy-oestra-1,3,5(10)-triene. I.R. (in CHCl$_3$): $\nu_{max}$ = 3602, 3490, 2838, 1608, 1570, 1490 and 1032 cm$^{-1}$. N.M.R. (in CDCl$_3$): δ = 0.81, 3.2(broad), 3.75, 3.9(broad), 4.8(broad), 6.85 and 6.6–7.4(multiplet) ppm.

b. According to the procedure described in Example IX e) 3 g of the mixture of 3-methoxy-6α and 6β,1-4α,17α-trihydroxy-oestra-1,3,5(10)-triene were converted with n-hexanal into a mixture of 3-methoxy-6α and 6β-hydroxy, 14α,17α-hexylidenedioxy-oestra-1,3,5(10)-triene (yield 2.2 g). I.R. (in KBr): $\nu_{max}$ = 3350, 3090, 3065, 3035, 1610, 1572, 1495, 1239, ± 1105 and 1040 cm$^{-1}$. N.M.R. (in CDCl$_3$): δ = 0.80, 0.87, 3.77, 3.9(broad), 4.7(multiplet), 4.9(multiplet), 6.87, 6.8 and 7.2 (AB-spectrum) ppm.

EXAMPLE XXXV

According to the procedure described in Example XXXIII 2.2 g of the mixture of 3-methoxy-6α and 6β-hydroxy-14α,17α-hexylidenedioxy-oestra-1,3,5(10)-triene obtained in Example XXXIV, were oxidized to 3-methoxy-14α,17α-hexylidenedioxy-oestra-1,3,5(10)-trien-6-one (yield 1.4 g of an oil). I.R. (in CHCl$_3$): $\nu_{max}$ = 1680, 1607, 1565, 1492, 1104 and 1034 cm$^{-1}$. N.M.R. (in CDCl$_3$): δ = 0.82, 0.87, 3.83, 4.0(broad), 4.96(triplet), 7.29 and 6.9–7.6(multiplet) ppm.

What we claim as new and desire to secure by letters patent is:

1. An oestratriene of the formula

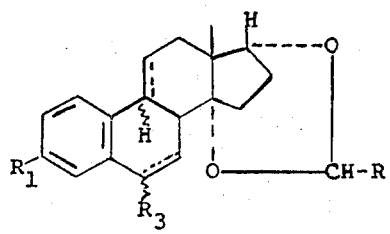

in which the dotted lines in the positions 6–7 and 9–11 indicate the optional presence of another bond, and wherein R represents a hydrogen atom, an aliphatic hydrocarbon group having less than 10 carbon atoms, a cycloalkyl group having less than 7 carbon atoms, an aryl group having less than 11 carbon atoms and which may be substituted by a nitro group or by methoxy groups, an adamantyl group, a furyl group or a thienyl group, $R_1$ represents a hydrogen atom or an $OR_2$ group, wherein $R_2$ represents a hydrogen atom, an aliphatic hydrocarbon group having less than 4 carbon atoms, a β-dimethylaminoethyl group, an acyl residue derived from acetic or sulfuric acid or an alkali metal salt thereof or a 1H-tetrazolyl group, and $R_3$ represents a hydrogen atom, a hydroxyl group, an acetoxy group or an oxo group.

2. An oestratriene according to claim 1, wherein the 6–7 and 9–11 positions are saturated, $R_1$ represents the group $OR_2$ and $R_3$ is a hydrogen atom.

3. An oestratriene according to claim 2 wherein $R_2$ represents a hydrogen atom or a methyl group.

4. An oestratriene according to claim 2, wherein $R_2$ represents an aliphatic hydrocarbon group having 3 carbon atoms or a β-dimethylaminoethyl group.

5. An oestratriene according to claim 2, wherein $R_2$ represents an acyl residue derived from acetic or sulfuric acid or an alkali metal salt thereof or a 1H-tetrazolyl group.

6. An oestratriene according to claim 1, wherein $R_1$ represents a hydrogen atom.

7. An oestratriene according to claim 1, wherein $R_3$ represents a hydroxyl group, an acetoxy group or an oxo group.

8. An oestratriene according to claim 1, wherein R represents a hydrogen atom or an aliphatic hydrocarbon group having less than 10 carbon atoms.

9. An oestratriene according to claim 1, wherein R represents an aryl group having less than 11 carbon atoms and which may be substituted by a nitro group or by methoxy groups.

10. An oestratriene according to claim 1, wherein R represents the cyclohexyl, an adamantyl, a furyl or a thienyl group.

11. An oestratriene according to claim 1 which is 3-hydroxy-14α,17α-methylenedioxy-oestra-1,3,5(10)-triene.

12. An oestratriene according to claim 1 which is 3-hydroxy-14α,17α-ethylidenedioxy-oestra-1,3,5(10)-triene.

13. An oestratriene according to claim 1 which is 3-hydroxy-14α,17α-hexylidenedioxy-oestra-1,3,5(10)-triene.

14. An oestratriene according to claim 1 which is 3-methoxy-14α,17α-ethylidenedioxy-oestra-1,3,5(10)-triene.

15. An oestratriene according to claim 1 which is 3-methoxy-6α- and 6β-acetoxy-14α,17α-ethylidene dioxy-oestra-1,3,5(10)-triene.

16. An oestratriene according to claim 1 which is 3-methoxy-14α,17α-ethylidenedioxy-9β-oestra-1,3,5(10)-triene.

17. An oestratriene according to claim 1 which is 3-methoxy-14α,17α-pentylidenedioxy-oestra-1,3,5(10)-triene.

18. An oestratriene according to claim 1 which is 3-methoxy-14α,17α-hexylidenedioxy-oestra-1,3,5(10)-triene.

19. An oestratriene according to claim 1 which is 3-methoxy-14α,17α-benzylidenedioxy-oestra-1,3,5(10)-triene.

20. An oestratriene according to claim 1 which is 3-hydroxy-14α,17α-cyclohexylmethylenedioxy-oestra-1,3,5(10)-triene.

21. An oestratriene according to claim 1 which is 3-hydroxy-14α,17α-(2-methylpropylidene)dioxy-oestra-1,3,5(10)-triene.

22. An oestratriene according to claim 1 which is 3-hydroxy-14α,17α-decylidenedioxy-oestra-1,3,5(10)-triene.

23. An oestratriene according to claim 1 which is 3-methoxy-14α,17α-(4'nitro-benzylidene)dioxy-oestra-1,3,5(10)-triene.

24. An oestratriene according to claim 1 which is 3-methoxy-14α,17α-(2-furfurylidene)dioxy-oestra-1,3,5(10)-triene.

25. An oestratriene according to claim 1 which is 3-methoxy-14α,17α-(2-thienylmethylene)dioxy-oestra-1,3,5(10)-triene.

26. An oestratriene according to claim 1 which is 3-methoxy-14α,17α-(1-naphthylmethylene)dioxy-oestra-1,3,5(10)-triene.

27. An oestratriene according to claim 1 which is 3-methoxy-14α,17α-(3',4',5'-trimethoxybenzylidene)dioxy-oestra-1,3,5(10)-triene.

28. An oestratriene according to claim 1 which is 3-methoxy-14α,17α-(1-adamantylmethylene)dioxy-oestra-1,3,5(10)-triene.

29. An oestratriene according to claim 1 which is 3-methoxy-14α,17α-(2-butenylidene)dioxy-oestra-1,3,5(10)-triene.

30. An oestratriene according to claim 1 which is 3-hydroxy-14α,17α-hexylidenedioxy-oestra-1,3,5(10)-triene 3-isopropyl ether.

31. An oestratriene according to claim 1 which is 3-hydroxy-14α,17α-hexylidenedioxy-oestra-1,3,5(10)-triene 3-allyl ether.

32. An oestratriene according to claim 1 which is 3-hydroxy-14α,17α-hexylidenedioxy-oestra-1,3,5(10)-triene 3-(β-dimethylaminoethyl)ether.

33. An oestratriene according to claim 1 which is 3-hydroxy-14α,17α-hexylidenedioxy-oestra-1,3,5(10)-triene 3-acetate.

34. An oestratriene according to claim 1 which is sodium 14α,17α-hexylidenedioxy-oestra-1,3,5(10)-triene 3-yl sulfate.

35. An oestratriene according to claim 1 which is 3-hydroxy-14α,17α-hexylidenedioxy-oestra-1,3,5(10)-triene 3-(1-phenyl-1H-tetrazolyl)ether.

36. An oestratriene according to claim 1 which is 14-α,17α-hexylidenedioxy-oestra-1,3,5(10)-triene.

37. An oestratriene according to claim 1 which is 3-methoxy-14α,17α-ethylidenedioxy-oestra-1,3,5(10),9(11)-tetraene.

38. An oestratriene according to claim 1 which is 3-hydroxy-14α,17α-hexylidenedioxy-oestra-1,3,5(10),6-tetraene.

39. An oestratriene according to claim 1 which is 3-methoxy-6α and 6β-hydroxy-14α,17α-ethylidenedioxy-oestra-1,3,5(10)-triene.

40. An oestratriene according to claim 1 which is 3-methoxy-14α,17α-ethylidenedioxy-oestra-1,3,5(10-trien-6-one.

41. An oestratriene according to claim 1 which is 3-methoxy-6α and 6β-hydroxy,14α,17α-hexylidenedioxy-oestra-1,3,5(10)-triene.

42. An oestratriene according to claim 1 which is 3-methoxy-14α,17α-hexylidenedioxy-oestra-1,3,5(10)-trien-6-one.

43. Process for the preparation of an oestratriene as defined in claim 1 which comprises decarboxylating an oestratriene-17β-carboxylic acid of the formula:

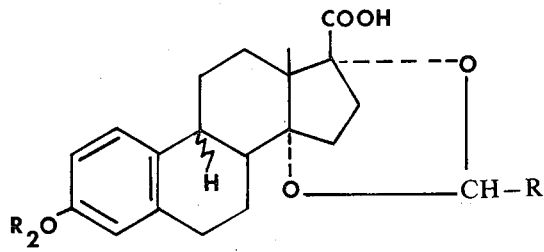

wherein R and R₂ are as defined in claim 1.

44. Process for the preparation of an oestratriene as defined in claim 1 which comprises decarboxylating an 14α,17α-phenylborylenedioxy-oestratriene-17β-carboxylic acid of the formula:

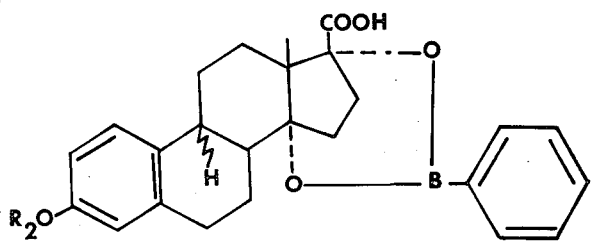

wherein R₂ is as defined in claim 1, hydrolysing a 14α,-17α-phenylborylenedioxy-oestratriene of the formula:

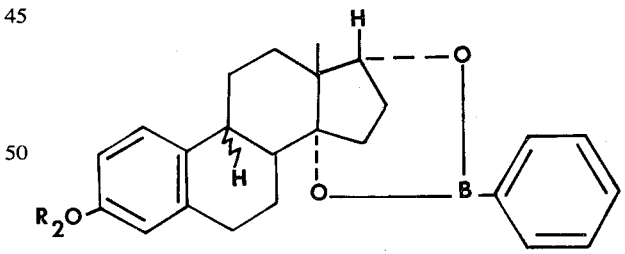

thus obtained, and reacting a 14α,17α-dihydroxy-oestratriene of the formula:

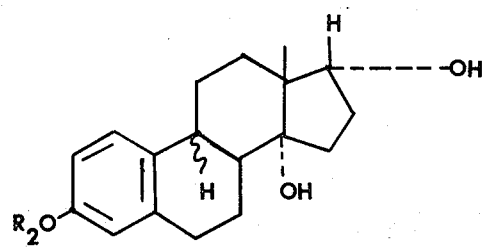

thus obtained, with an aldehyde of the formula RCHO, wherein R is as defined in claim 1.

45. Process for the preparation of an oestratriene as defined in claim 1 which comprises decarboxylating an androstene-17β-carboxylic acid of the formula:

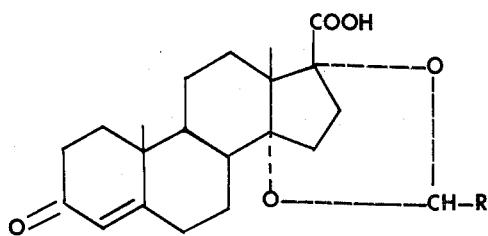

wherein R is as defined in claim 1, dehydrogenating in the 1,2-position an androstene derivative of the formula:

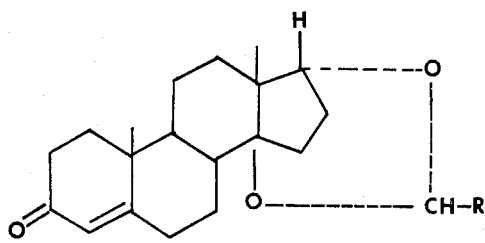

thus obtained, aromatising an androsta-1,4-dien-3-one of the formula:

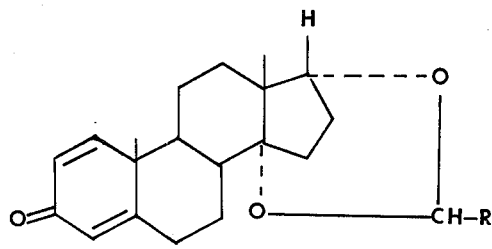

thus obtained, and optionally converting a 3-hydroxy-oestratriene of the formula:

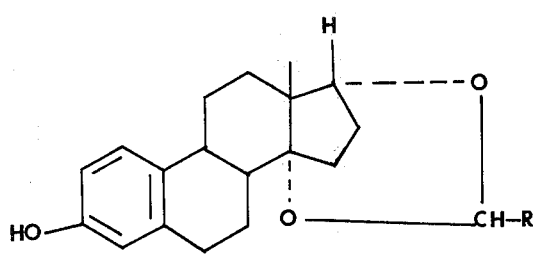

thus obtained with a compound selected from the group consisting of a halogenide of the formula $R_2'$-hal and a sulfate of the formula $(R_2')_2SO_4$; wherein $R_2'$ represents an aliphatic hydrocarbon group having less than 4 carbon atoms, a β-dimethylaminaethyl group or a 1H-tetrazolyl group, to a corresponding 3-ether of the formula:

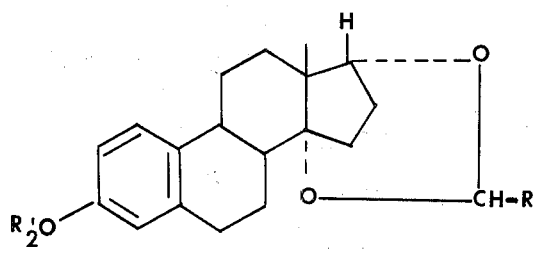

46. Process for the preparation of an oestratriene as defined in claim 1 which comprises converting 14α-hydroxy-oestrone with a compound selected from the group consisting of a halogenide of the formula $R_2'$-hal and a sulphate of the formula $(R_2')_2 SO_4$, wherein $R_2'$ is as defined in claim 45, to a corresponding 3-ether of the formula:

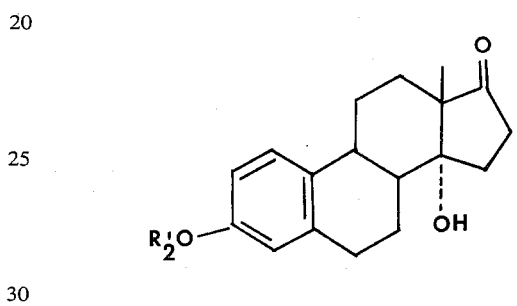

reacting a compound thus obtained with hydrazine to obtain a corresponding 17-hydrazone derivative of the formula:

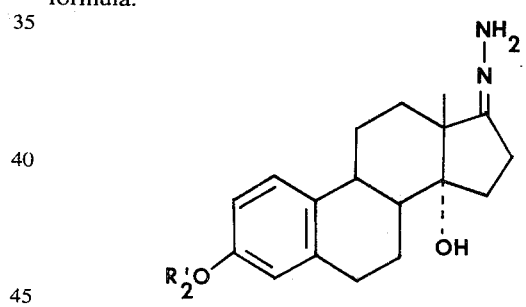

oxidizing a 17-hydrazone compound thus obtained with iodine to a corresponding 17-iodo derivative, reducing this compound with sodium and an alkanol to a corresponding 16-dehydro derivative of the formula:

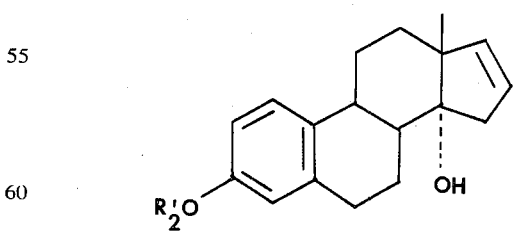

converting a 16-dehydro derivative thus obtained with a peracid to a corresponding 16α,17α-epoxy derivative, reducing this compound by means of LiAlH₄ to a 14α,17α-dihydroxy-oestratriene of the formula:

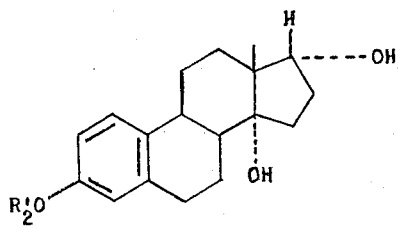
and converting a compound thus obtained with an aldehyde of the formula RCHO, wherein R is as defined in claim 1.
* * * * *